United States Patent
Araki et al.

(10) Patent No.: US 6,738,234 B1
(45) Date of Patent: May 18, 2004

(54) THIN FILM MAGNETIC HEAD AND MAGNETIC TRANSDUCER

(75) Inventors: Satoru Araki, Tokyo (JP); Koji Shimazawa, Tokyo (JP)

(73) Assignee: TDK Corporation, Tokyo (JP)

(*) Notice: Subject to any disclaimer, the term of this patent is extended or adjusted under 35 U.S.C. 154(b) by 411 days.

(21) Appl. No.: 09/685,894

(22) Filed: Oct. 11, 2000

Related U.S. Application Data
(60) Provisional application No. 60/189,466, filed on Mar. 15, 2000.

(51) Int. Cl.[7] .............................................. G11B 5/39

(52) U.S. Cl. ...................................... 360/324; 360/319

(58) Field of Search ....................... 360/324, 324.11, 360/324.12, 313, 319, 321, 324.2

(56) References Cited

U.S. PATENT DOCUMENTS

| | | | | |
|---|---|---|---|---|
| 5,627,704 A | * | 5/1997 | Lederman et al. | 360/321 |
| 5,657,191 A | * | 8/1997 | Yuan | 360/324 |
| 5,696,656 A | * | 12/1997 | Gill et al. | 360/319 |
| 5,867,025 A | * | 2/1999 | Allenspach et al. | 324/252 |
| 5,898,548 A | * | 4/1999 | Dill et al. | 360/324.2 |
| 5,901,018 A | | 5/1999 | Fontana, Jr. et al. | |
| 5,903,708 A | * | 5/1999 | Kano et al. | 360/32 |
| 5,905,611 A | * | 5/1999 | Yoda et al. | 360/324.1 |
| 6,078,484 A | * | 6/2000 | Sakakima | 360/324 |
| 6,097,579 A | * | 8/2000 | Gill | 360/324.2 |
| 6,101,071 A | * | 8/2000 | Kouchiyama | 360/324 |
| 6,344,954 B1 | * | 2/2002 | Redon et al. | 360/324.2 |
| 6,353,519 B2 | * | 3/2002 | Pinarbasi | 360/324.11 |
| 6,381,107 B1 | * | 4/2002 | Redon et al. | 360/324.2 |
| 6,477,018 B1 | * | 11/2002 | Terunuma | 360/317 |
| 6,519,120 B1 | * | 2/2003 | Lee et al. | 360/324.1 |
| 2001/0028537 A1 | * | 10/2001 | Gill | 360/314 |

FOREIGN PATENT DOCUMENTS

| | | | | |
|---|---|---|---|---|
| GB | 2169434 A | * | 7/1986 | G11B/5/33 |
| JP | 4-360009 | | 12/1992 | |
| JP | 5-067820 | | 3/1993 | |
| JP | 5-090026 | | 4/1993 | |
| JP | 5-275769 | | 10/1993 | |
| JP | 7-078316 | | 3/1995 | |
| JP | 08030925 A | * | 2/1996 | G11B/5/39 |
| JP | 08329423 A | * | 12/1996 | G11B/5/39 |
| JP | 9-129445 | | 5/1997 | |
| JP | 9-180135 | | 7/1997 | |
| JP | 10172117 A | * | 6/1998 | G11B/5/39 |
| JP | 11259824 A | * | 9/1999 | G11B/5/39 |
| JP | 11353621 A | * | 12/1999 | G11B/5/39 |

* cited by examiner

Primary Examiner—William Klimowicz
(74) Attorney, Agent, or Firm—Oliff & Berridge, PLC

(57) ABSTRACT

An object of the invention is to provide a thin film magnetic head and a magnetic transducer, which can obtain resistance properties adaptable to ultra-high-density recording. The thin film magnetic head has a stack including a plurality of magnetic layers stacked alternately with a plurality of non-magnetic layers. The stack is divided into a first region and a second region in a direction of stacking. The first region comprises a projecting portion projecting toward a magnetic medium, an extending portion extending in the direction opposite to the projecting portion, and a pair of wide portions widened in the direction perpendicular to the direction in which the extending portion extends. An end surface of the projecting portion is exposed to the outside and faces the magnetic medium. Thus, the end surface functions as a magnetic field capturing portion for capturing a signal magnetic field of the magnetic medium. The stack has the projecting portion, and the projecting portion functions as the magnetic field capturing portion. Thus, the number of layers of the stack can be increased without increasing a length of a surface facing the magnetic medium. Therefore, the rate of resistance change and the resistance can be increased.

19 Claims, 14 Drawing Sheets

THIN FILM MAGNETIC HEAD AND MAGNETIC TRANSDUCER

BACKGROUND OF THE INVENTION

1. Field of the Invention

The invention relates to a thin film magnetic head and a magnetic transducer for use in the same. More particularly, the invention relates to a thin film magnetic head and a magnetic transducer which can obtain resistance properties adaptable to ultra-high-density recording.

2. Description of the Related Art

Recently, an improvement in performance of a thin film magnetic head has been sought in accordance with an increase in a surface recording density of a hard disk or the like. A composite thin film magnetic head, which has a stacked structure comprising a reproducing head having a magnetoresistive element (hereinafter referred to as an MR element) that is a type of magnetic transducer and a recording head having an inductive magnetic transducer, is widely used as the thin film magnetic head.

MR elements include an element using a magnetic film (an AMR film) exhibiting an anisotropic magnetoresistive effect (an AMR effect), and an element using a magnetic film (a GMR film) exhibiting a giant magnetoresistive effect (a GMR effect). The GMR film is mainly used in the MR element for the reproducing head whose surface recording density exceeds 3 Gbit/inch$^2$. As the GMR film, a "multi-layered type (antiferromagnetic type)" film, an "inductive ferromagnetic type" film, a "granular type" film, a "spin valve type" film and the like are proposed. Of these types of films, the spin valve type GMR film is used for the industrialization of a magnetic head.

The spin valve type GMR film has a stacked structure comprising; a magnetic layer having the fixed orientation of magnetization; and a magnetic layer having the orientation of magnetization changing in accordance with a signal magnetic field, in which the magnetic layers are stacked with the nonmagnetic layer in between. Electrical resistance changes in accordance with a relative angle between the orientations of magnetizations of the two magnetic layers. The spin valve type GMR film obtains the rate of resistance change of 2% to 6% (U.S. Pat. No. 5,408,377).

Moreover, a "tunnel junction type" GMR film utilizing a tunnel current passing through a thin insulating layer has been recently developed (U.S. Pat. No. 5,901,018). The tunnel junction type GMR film has a structure in which an insulating layer is sandwiched between two magnetic layers. During the passage of the tunnel current through the insulating layer, electrical resistance changes in accordance with the signal magnetic field. The tunnel junction type GMR film obtains electrical resistance so high that a junction area becomes small. However, shot noise is caused and thus the S/N (signal to noise) ratio becomes low. Consequently, the tunnel junction type GMR film has the limitations of improvement in properties of the magnetic head.

Therefore, attention has been recently paid to an MR element having the so-called CPP (Current Perpendicular to the Plane) structure in which a current is passed through the multilayered type GMR film in the direction of stack (Japanese Unexamined Patent Application Publication No. Hei 5-275769). The multilayered type GMR film has a stack comprising magnetic layers stacked alternately with nonmagnetic layers. The orientations of magnetizations of the magnetic layers change in accordance with the signal magnetic field, and thus electrical resistance changes. The above-mentioned multilayered type GMR film is disclosed in, for example, Japanese Unexamined Patent Application Publication No. Hei 4-360009, Japanese Patent No. 2610376, Japanese Unexamined Patent Application Publication No. Hei 5-90026, Japanese Unexamined Patent Application Publication No. Hei 7-78316 and Japanese Unexamined Patent Application Publication No. Hei 9-180135. According to the multilayered type GMR film, the rate of resistance change is about 1% to 10% when the current is passed perpendicularly to the direction of stacking (Japanese Unexamined Patent Application Publication No. Hei 5-90026). The rate of resistance change is about 10% to 15% when the current is passed in the direction of stacking.

However, currently, demand for high-density recording on the hard disk or the like is increasingly growing. Thus, the surface recording density exceeding 100 Gbit/inch$^2$ is required. A size of the MR element must be about 0.1 $\mu$m in order to meet the demand for such ultra-high-density recording. It is thus necessary to ensure higher head output. A still higher rate of resistance change is therefore needed. Consequently, there is a problem that the heretofore-reported rate of resistance change of 10% to 15% of the CPP structure is insufficient.

In the case of the CPP structure, the rate of resistance change and resistance can be increased as the number of magnetic layers is increased. However, when the number of magnetic layers is increased and thus a thickness of the stack along the direction of stacking is increased, a length of a surface facing a recording surface increases in the direction of thickness of the stack. Thus, there is a problem of inadaptability to high-density recording.

SUMMARY OF THE INVENTION

It is an object of the invention to provide a thin film magnetic head and a magnetic transducer, which have resistance properties adaptable to ultra-high-density recording.

A thin film magnetic head of the invention comprises a stack including a plurality of magnetic layers stacked alternately with a plurality of nonmagnetic layers, the stack having a projecting portion projecting toward a magnetic medium.

In a thin film magnetic head of the invention, a signal magnetic field of the magnetic medium is captured by the projecting portion of the stack. Therefore, the number of magnetic layers of the stack can be increased without increasing a length (sometimes called a magnetic gap length) of a signal magnetic field capturing surface along the direction of stacking of the stack. Accordingly, the rate of resistance change and resistance can be increased.

In a thin film magnetic head of the invention, it is preferable that a length of the projecting portion along the projecting direction thereof is 0.1 $\mu$m or less. Preferably, a thin film magnetic head further comprises a current path for passing a current through the stack in the direction of stacking. Preferably, a pair of shield layers and a pair of gap layers for sandwiching the stack therebetween function as the current path. Preferably, the stack has an edge face facing the magnetic medium, and at least one of the shield layers has a magnetic field capture limiting portion for partially limiting an effect of a signal magnetic field on the stack through the edge face. Preferably, the stack has a part facing a magnetic medium, and at least one of the shield layers has a magnetic field capture limiting portion provided in an area corresponding to the part of the stack.

Preferably, at least one of the magnetic layers is made of a material containing at least Co in a group including Co (cobalt), Fe (iron) and Ni (nickel), or a material containing at least Ni in a group including Ni, Co, Fe, Cr (chromium), Ta (tantalum), Rh (rhodium), Mo (molybdenum), Zr (zirconium) and Nb (niobium). Preferably, at least one of the magnetic layers includes a nickel-containing layer made of a material containing at least Ni in a group including Ni, Co, Fe, Cr, Ta, Rh, Mo, Zr and Nb, and a cobalt-containing layer made of a material containing at least Co in a group including Co, Fe and Ni.

Preferably, a thickness of each of the magnetic layers is from 1 nm to 6 nm inclusive. Preferably, the number of the magnetic layers is from 2 to 20 inclusive. Preferably, at least one of the nonmagnetic layers is made of a material containing at least one element in a group consisting of Au (gold), Ag (silver), Cu (copper), Ru (ruthenium), Rh, Re (rhenium), Pt (platinum) and W (tungsten). Preferably, at least one of the nonmagnetic layers is made of a material containing Ni and Cr. Preferably, one of the nonmagnetic layers, which is located on one outermost side in the direction of stacking, is made of a material containing Ni and Cr.

Preferably, a thickness of each of the nonmagnetic layers is set so as to maximize antiferromagnetic coupling energy induced between two magnetic layers adjacent to each other with each of the nonmagnetic layers in between. Preferably, the antiferromagnetic coupling energy generated between two magnetic layers adjacent to each other with each of the nonmagnetic layers in between is from $0.1 \times 10^{-4}$ $J/m^2$ to $2.0 \times 10^{-4}$ $J/m^2$ inclusive.

Preferably, the stack has a plurality of regions into which the stack is divided in the direction of stacking, and at least two regions of the regions differ from each other in a material or composition of the magnetic layers. Preferably, the stack has a first region including the magnetic layers made of a material containing at least Ni in a group consisting of Ni, Co, Fe, Cr, Ta, Rh, Mo, Zr and Nb, and a second region including the magnetic layers made of a material containing at least Co in a group consisting of Ni, Co and Fe. Preferably, the projecting portion is provided in the first region.

Another thin film magnetic head of the invention comprises a stack including a plurality of magnetic layers stacked alternately with a plurality of nonmagnetic layers; and a shield layer having a magnetic field capture limiting portion for partially limiting an effect of a signal magnetic field of the magnetic medium on the stack through the edge face.

Still another thin film magnetic head of the invention comprises a stack which has a part facing a magnetic medium, including a plurality of magnetic layers stacked alternately with a plurality of nonmagnetic layers; and a shield layer having a magnetic field capture limiting portion provided in an area corresponding to the part of the stack.

In another thin film magnetic head of the invention or still another thin film magnetic head of the invention, a part of the signal magnetic field to be captured by the stack is limited by the magnetic field capture limiting portion.

A further thin film magnetic head of the invention comprises a stack including a plurality of magnetic layers stacked alternately with a plurality of nonmagnetic layers; and a pair of shield layers sandwiching the stack therebetween with a pair of gap layers in between, wherein the stack is partially in contact with at least one of the pair of shield layers.

In a further thin film magnetic head of the invention, a magnetic path extending from the projecting portion of the stack toward at least one of the shield layers is formed. Therefore, the signal magnetic field easily extends throughout the stack.

A magnetic transducer of the invention comprises a stack having a plurality of magnetic layers stacked alternately with a plurality of nonmagnetic layers, the stack having a projecting portion so as to face a signal magnetic field.

In a magnetic transducer of the invention, the signal magnetic field of the magnetic medium is captured by the projecting portion of the stack. Therefore, the number of magnetic layers of the stack can be increased without increasing the length (the magnetic gap length) of the signal magnetic field capturing surface along the direction of stacking of the stack.

Another magnetic transducer of the invention comprises a stack having a plurality of magnetic layers stacked alternately with a plurality of nonmagnetic layers and having an edge face facing a signal magnetic field; and a magnetic field capture limiting portion provided on the edge face side of the stack in order to partially limit an effect of signal magnetic field on the stack through the edge face.

Still another magnetic transducer of the invention comprises a stack having a plurality of magnetic layers stacked alternately with a plurality of nonmagnetic layers and having an edge face facing a signal magnetic field; and a magnetic field capture limiting portion made of a magnetic material and provided in an area corresponding to a part of the stack on the edge face side of the stack.

In another magnetic transducer of the invention or still another magnetic transducer of the invention, a part of the signal magnetic field is limited by the magnetic field capture limiting portion.

Other and further objects, features and advantages of the invention will appear more fully from the following description.

DETAILED DESCRIPTION OF THE PREFERRED EMBODIMENTS

First Embodiment

<Structures of MR Element and Thin Film Magnetic Head>

Firstly, the respective structures of an MR element that is a specific example of a magnetic transducer according to a first embodiment of the invention and a thin film magnetic head using the MR element will be described with reference to FIGS. 1 to 11.

Figure 1:
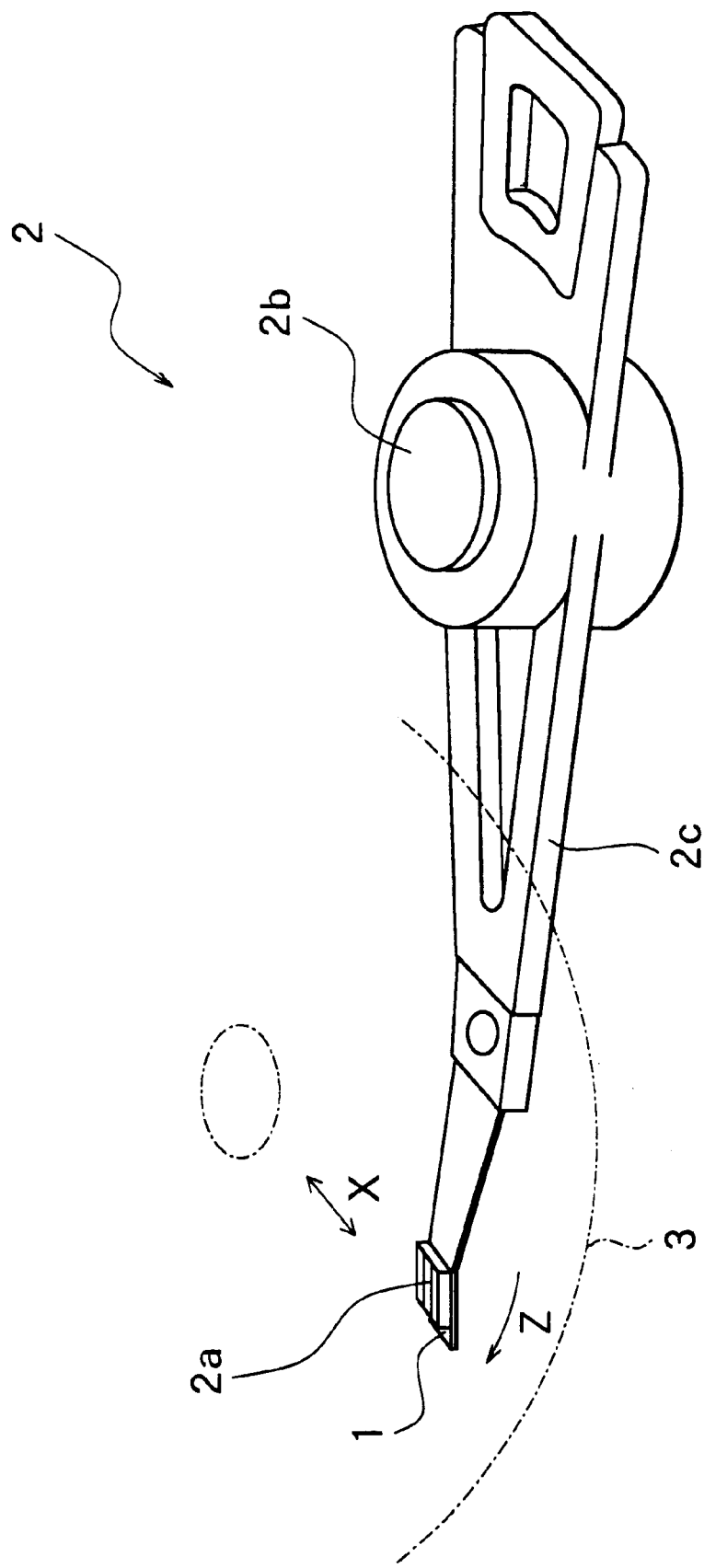
FIG. 1 is a perspective view of a configuration of an actuator arm comprising a thin film magnetic head according to a first embodiment of the invention.

FIG. 1 shows the configuration of an actuator arm 2 comprising a thin film magnetic head 1 according to the embodiment. The actuator arm 2 is used in a hard disk drive (not shown) or the like, for example. The actuator arm 2 has a slider 2a on which the thin film magnetic head 1 is formed. For example, the slider 2a is mounted on the end of an arm 2c rotatably supported by a supporting pivot 2b. The arm 2c is rotated by a driving force of a voice coil motor (not shown), for example. Thus, the slider 2a moves in a direction x in which the slider 2a crosses a track line along a recording surface of a magnetic medium 3 such as a hard disk (a lower surface of the recording surface in FIG. 1). For example, the magnetic medium 3 rotates in a direction z substantially perpendicular to the direction x in which the slider 2a crosses the track line. The magnetic medium 3 rotates and the slider 2a moves in this manner, whereby information is recorded on the magnetic medium 3 or recorded information is read out from the magnetic medium 3.

Figure 2:
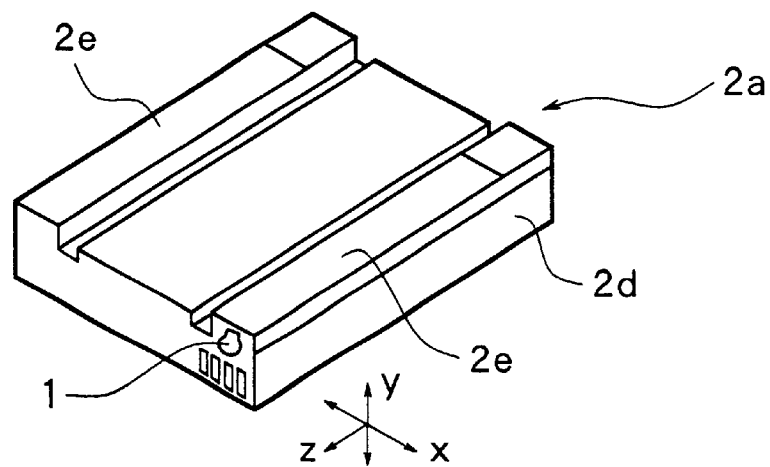
FIG. 2 is a perspective view of a configuration of a slider of the actuator arm shown in FIG. 1.

FIG. 2 shows the configuration of the slider 2a shown in FIG. 1. The slider 2a has a block-shaped base 2d made of $Al_2O_3$—TiC (altic), for example. The base 2d is substantially hexahedral, for instance. One face of the hexahedron closely faces the recording surface of the magnetic medium 3 (see FIG. 1). A surface facing the recording surface of the magnetic medium 3 is called an air bearing surface (ABS) 2e. When the magnetic medium 3 rotates, airflow generated between the recording surface of the magnetic medium 3 and the air bearing surface 2e allows the slider 2a to slightly move away from the recording surface in a direction y opposite to the recording surface. Thus, a constant distance is provided between the air bearing surface 2e and the magnetic medium 3. The thin film magnetic head 1 is formed on one side (the left side in FIG. 2) adjacent to the air bearing surface 2e of the base 2d.

Figure 3:
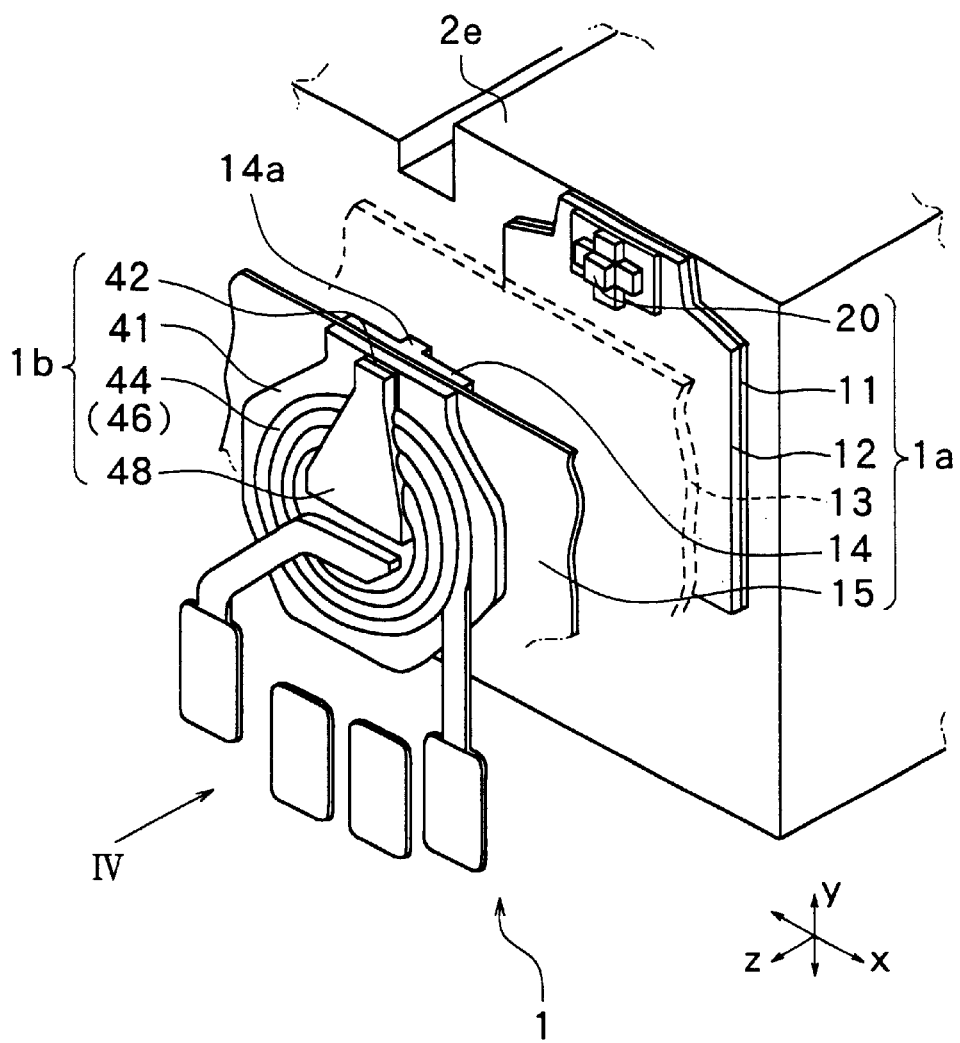
FIG. 3 is an exploded perspective view of a structure of the thin film magnetic head according to the first embodiment.
Figure 4:
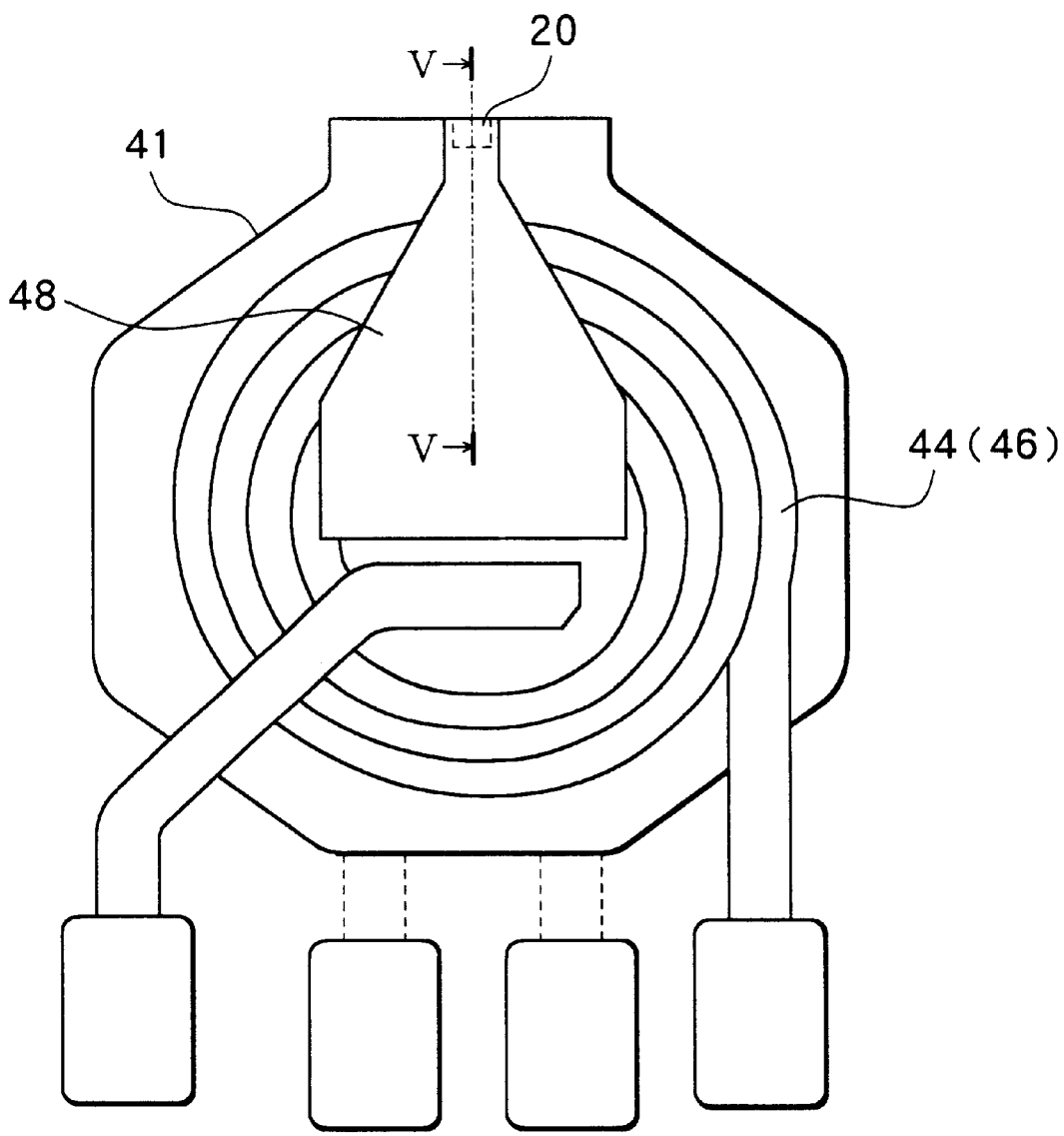
FIG. 4 is a plan view of a structure of the thin film magnetic head shown in FIG. 3 viewed from the direction of the arrow IV of FIG. 3.
Figure 5:
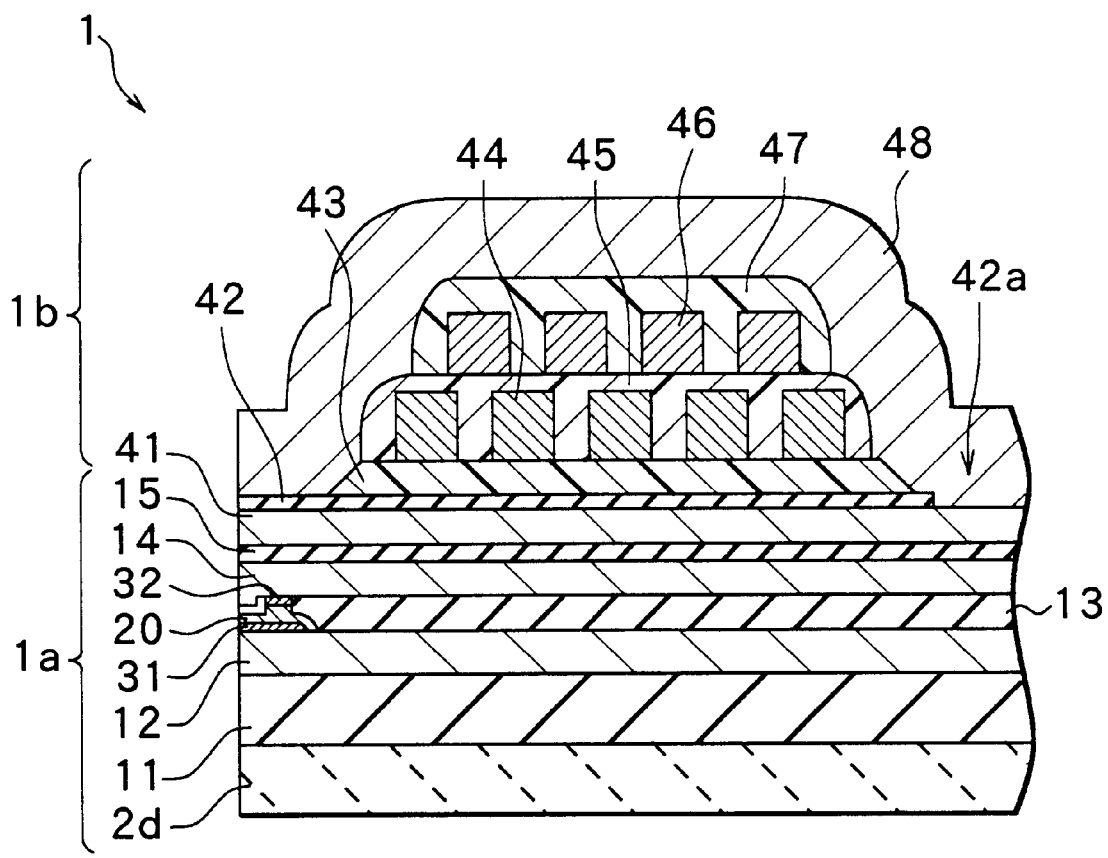
FIG. 5 is a sectional view of a structure of the thin film magnetic head shown in FIG. 3 viewed from the direction of the arrows along the line V—V of FIG. 4.
Figure 5:
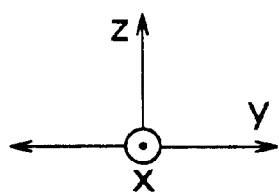

FIG. 3 is an exploded view of the structure of the thin film magnetic head 1. FIG. 4 shows a plan structure viewed from the direction of the arrow IV of FIG. 3. FIG. 5 shows a sectional structure viewed from the direction of the arrows along the line V—V of FIG. 4. The thin film magnetic head 1 has an integral structure comprising a reproducing head 1a for reproducing magnetic information recorded on the magnetic medium 3 and a recording head 1b for recording magnetic information on the track line of the magnetic medium 3.

As shown in FIGS. 3 and 5, for example, the reproducing head 1a has a stacked structure comprising an insulating layer 11, a first shield layer 12, an insulating layer 13, a second shield layer 14 and an insulating layer 15, which are stacked on the base 2d in this order. For example, the insulating layer 11 is 2 μm to 10 μm in thickness along the direction of stack (hereinafter referred to as a thickness) and is made of $Al_2O_3$ (aluminum oxide). For example, each of the first and second shield layers 12 and 14 is 1 μm to 3 μm in thickness and is made of a magnetic metal material such as NiFe (nickel-iron alloy). The first and second shield layers 12 and 14 are layers for preventing an influence of an unnecessary magnetic field on a stack 20 to be described later. The first and second shield layers 12 and 14 also function as current paths for passing a current through the stack 20 in the direction of stacking. For example, each of the insulating layers 13 and 15 is 10 nm to 100 nm in thickness and is made of $Al_2O_3$ or AlN (aluminum nitride). The insulating layer 13 is a layer for providing electrical insulation between the first shield layer 12 and the second shield layer 14. The insulating layer 15 is a layer for providing electrical insulation between the reproducing head 1a and the recording head 1b.

Figure 6:
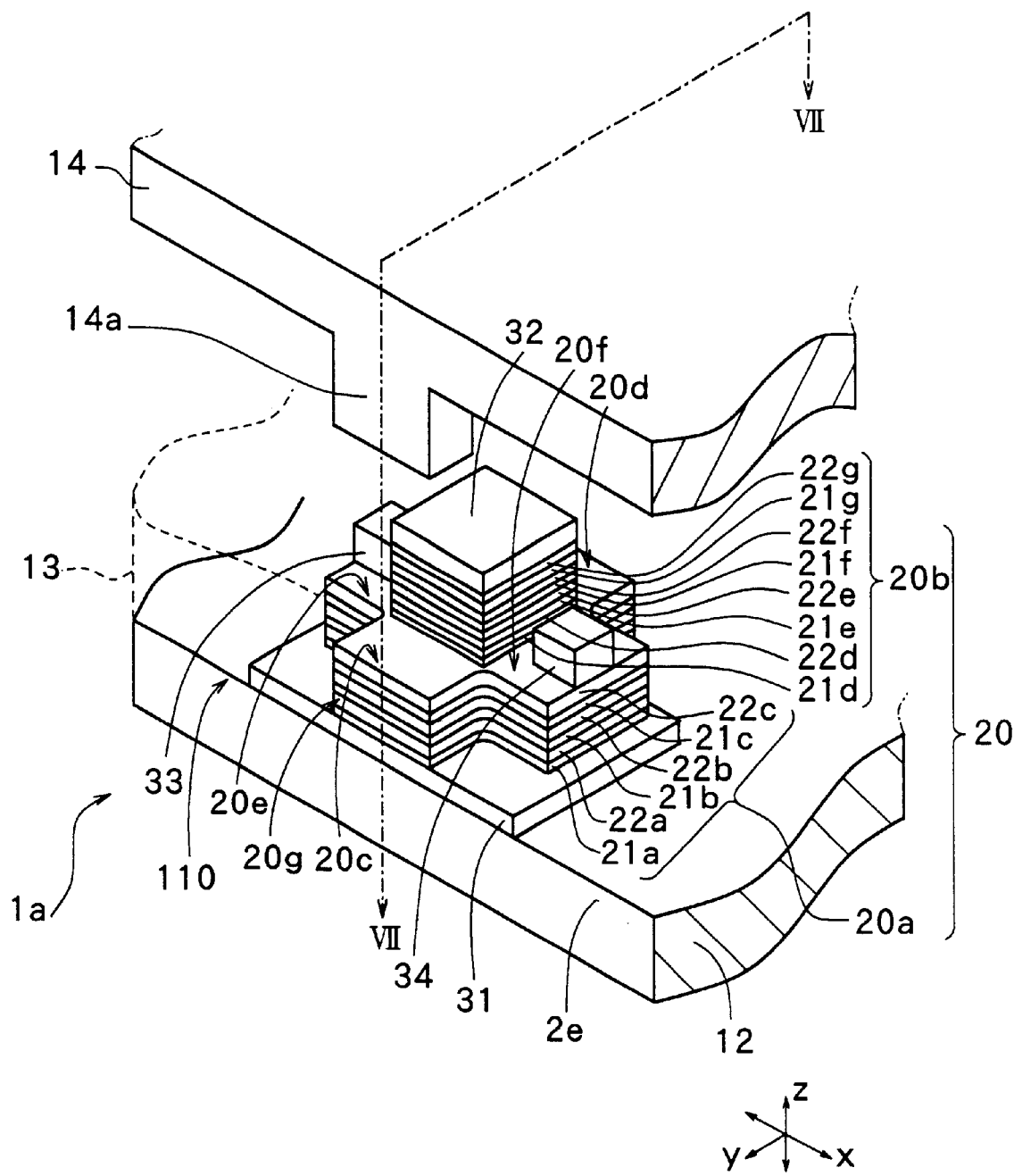
FIG. 6 is a perspective view of a general structure of a reproducing head of the thin film magnetic head shown in FIG. 5.
Figure 7:
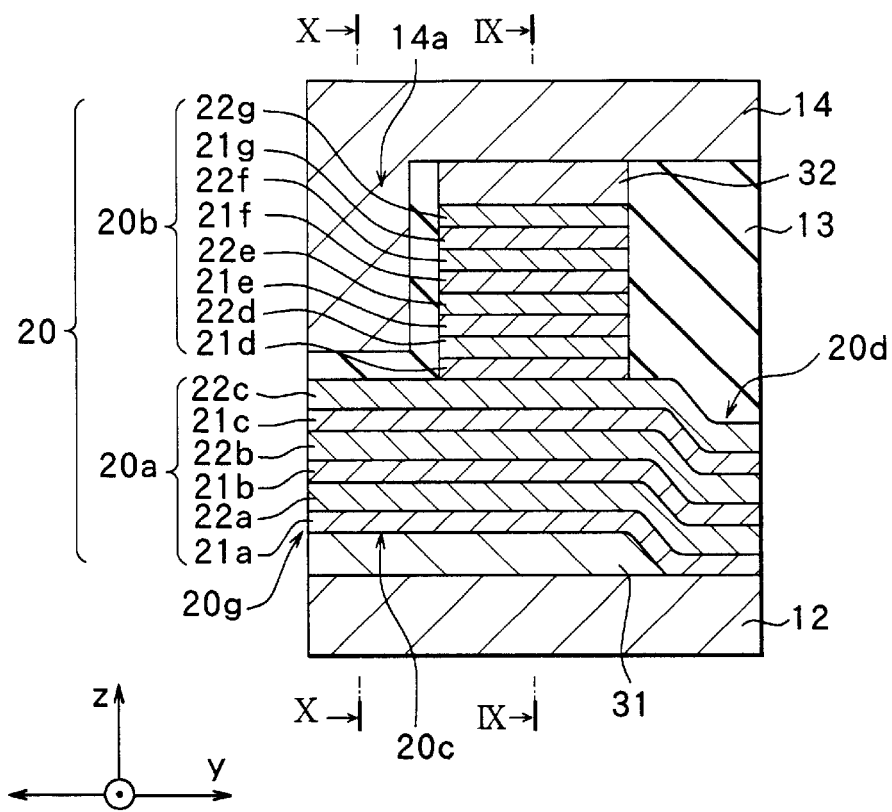
FIG. 7 is a sectional view of a sectional structure of a magnetic transducer shown in FIG. 6 viewed from the direction of the arrows along the line VII—VII of FIG. 6.
Figure 8:
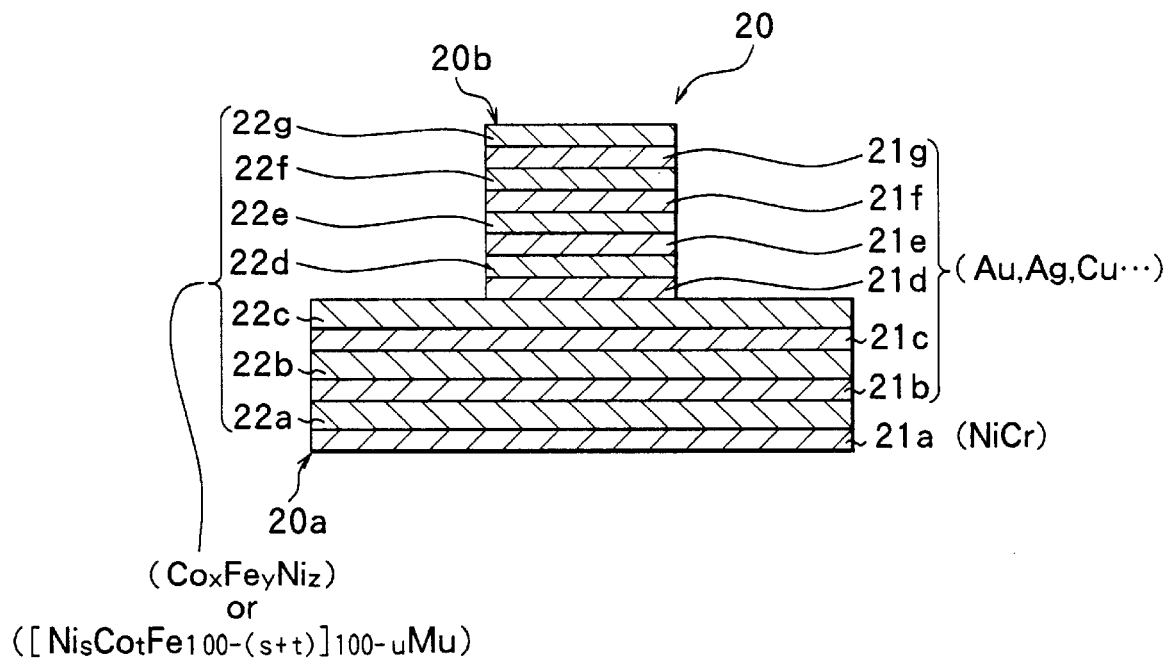
FIG. 8 is a sectional view of a stack of the magnetic transducer shown in FIG. 7.
Figure 9:
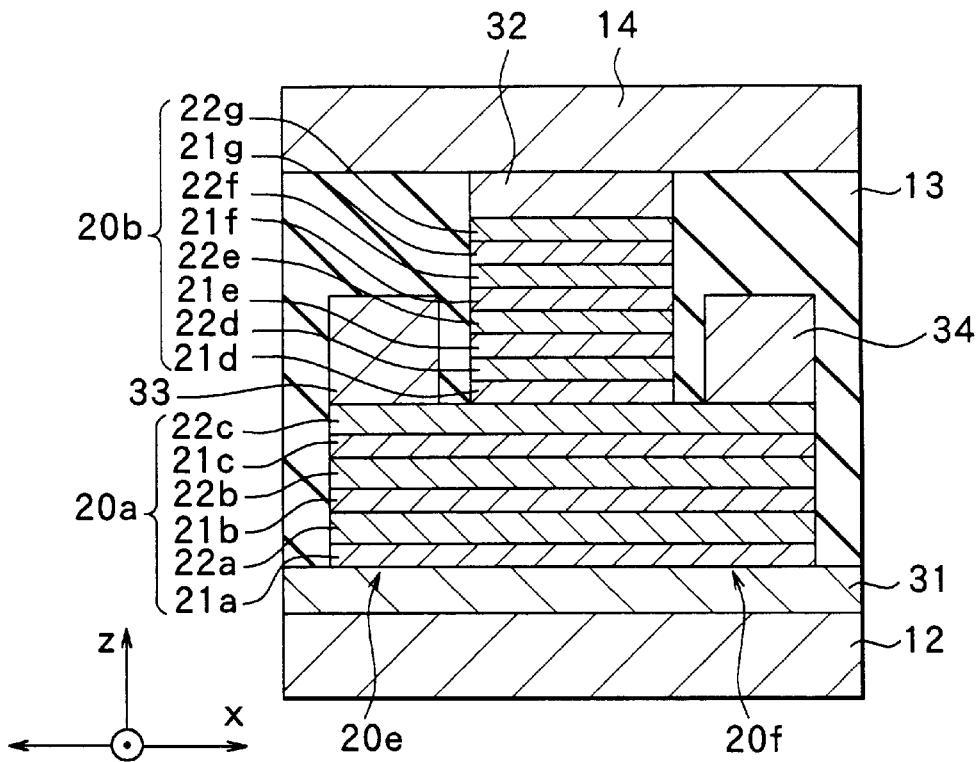
FIG. 9 is a sectional view of a sectional structure of the magnetic transducer shown in FIG. 7 viewed from the direction of the arrows along the line VIII—VIII of FIG. 7.
Figure 10:
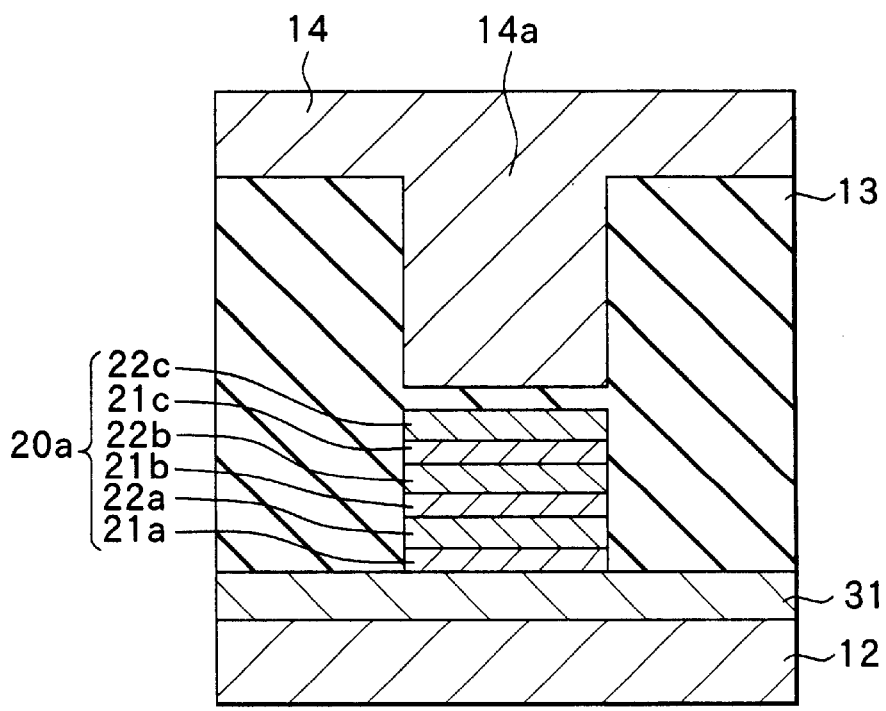
FIG. 10 is a sectional view of a sectional structure of the magnetic transducer shown in FIG. 7 viewed from the direction of the arrows along the line IX—IX of FIG. 7.

FIG. 6 is a schematic exploded view of the structure of the reproducing head 1a of the thin film magnetic head 1 shown in FIG. 3. FIG. 7 shows a sectional structure taken along the line VII—VII of FIG. 6. FIG. 8 shows only the stack of the thin film magnetic head shown in FIG. 7. FIG. 9 shows a sectional structure viewed from the direction of the arrows along the line IX—IX of FIG. 7. FIG. 10 shows a sectional structure viewed from the direction of the arrows along the line X—X of FIG. 7. An MR element 110 including the stack 20 that is a multilayered type GMR film is formed between the first and second shield layers 12 and 14 close to the air bearing surface 2e with first and second gap layers 31 and 32 in between. For example, each of the first and second gap layers 31 and 32 is 2 nm to 30 nm in thickness and is made of a nonmagnetic metal material containing at least one element in a group consisting of Ta, W, Ru, Pt, Re, Rh, Cr, Al, Cu, Au and Ag. The first and second gap layers 31 and 32 are layers for shielding magnetic coupling between the stack 20 and the first and second shield layers 12 and 14. Similarly to the first and second shield layers 12 and 14, the first and second gap layers 31 and 32 also function as the current paths for passing a current through the stack 20 in the direction of stack.

As shown in FIG. 7, the stack 20 has a stacked structure comprising seven nonmagnetic layers 21a, 21b, 21c, 21d, 21e, 21f and 21g and seven magnetic layers 22a, 22b, 22c, 22d, 22e, 22f and 22g, in which the nonmagnetic and magnetic layers alternate with each other in the direction in which the first and second gap layers 31 and 32 face each other.

In the stack 20, the orientations of magnetizations of the magnetic layers 22a to 22g are fixed by antiferromagnetic coupling between two adjacent ones of the magnetic layers 22a to 22g adjacent to each other with each of the nonmagnetic layers 21b to 21g in between. Preferably, antiferromagnetic coupling energy generated between two adjacent ones of the magnetic layers 22a to 22g is $0.1\times10^{-4}$ J/m$^2$ to $2.0\times10^{-4}$ J/m$^2$, for example. Too weak antiferromagnetic coupling causes a low rate of resistance change. Too intense antiferromagnetic coupling causes little change in the orientation of magnetization under a signal magnetic field and thus results in low sensitivity. Under no signal magnetic field, an angle between the orientations of magnetizations of two adjacent ones of the magnetic layers 22a to 22g is preferably 90 deg or more, or more preferably from 100 deg to 260 deg inclusive.

Of the layers of the stack 20, the nonmagnetic layer 21a located closest to the first gap layer 31 is used as an underlayer on which the magnetic layers 22a to 22g and the other nonmagnetic layers 21b to 21g are to be formed. Hereinafter, the nonmagnetic layer 21a is referred to as an underlayer 21a.

As shown in FIG. 8, the underlayer 21a is made of a material containing Ni and Cr, for example. This can improve smoothness of interfaces between the magnetic layers 22a to 22g and the nonmagnetic layers 21b to 21g and can improve crystallizability of the magnetic layers 22a to 22g. Specifically, it is preferable that the underlayer 21a is made of $(Ni_aCr_{100-a})_bA_{100-b}$, where A denotes any metallic element other than Ni and Cr. Preferably, a and b are $40\leq a\leq 75$ and $80\leq b\leq 100$ in units of at %, respectively, a and b are within the above-mentioned ranges, whereby the interfaces between the nonmagnetic layers 21b to 21g and the magnetic layers 22a to 22g can be made smoother. The range of a is more preferably $50\leq a\leq 70$, or most preferably $55\leq a\leq 65$. Preferably, a thickness of the underlayer 21a is 1 nm to 10 nm. The thickness of the underlayer 21a is within the above-mentioned range, whereby thermal stability of the stack 20 improves and the rate of resistance change thereof increases.

Each of the nonmagnetic layers 21b to 21g is made of, for example, a nonmagnetic metal material containing at least one element in a group consisting of Au, Ag, Cu, Ru, Rh, Re, Pt and W, and the percentage of content of the at least one element is 60 at % or more. Preferably, the thickness of each of the nonmagnetic layers 21b to 21g is set so as to maximize the antiferromagnetic coupling energy induced between two adjacent ones of the magnetic layers 22a to 22g adjacent to each other with each of the nonmagnetic layers 21b to 21g in between. The antiferromagnetic coupling energy is maximized, whereby the angle between the orientations of magnetizations of two adjacent ones of the magnetic layers 22a to 22g can be about 180 deg and the rate of resistance change can be increased.

Figure 11:
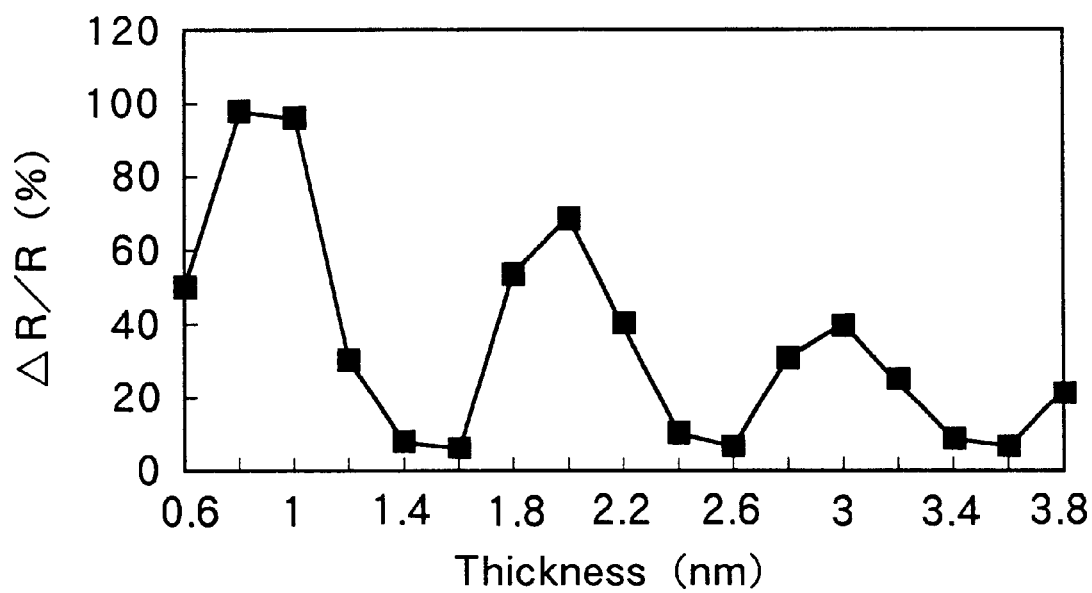
FIG. 11 is a plot of the correlation between the thickness of a nonmagnetic layer and the rate of resistance change.

FIG. 11 shows the correlation between the thickness of each of the nonmagnetic layers 21b to 21g and the rate $\Delta R/R$ of resistance change of the stack 20. FIG. 11 shows properties generally called RKKY (Ruderman-Kittel-Kasuya-Yoshida) interaction. FIG. 11 shows the case where the stack has a structure in which the number of magnetic layers is 20, each nonmagnetic layer is made of Cu, each magnetic layer is made of $Co_{80}Fe_{15}Ni_5$ and the thickness of the nonmagnetic layer is changed by every 0.2 nm within a range of from 0.6 nm to 3.8 nm. As shown in FIG. 11, the rate of resistance change takes on some maximum values in accordance with the thickness of the nonmagnetic layer. The correlation between the rate of resistance change and the thickness of the nonmagnetic layer corresponds to the correlation between the antiferromagnetic coupling energy induced between two adjacent magnetic layers and the thickness of the nonmagnetic layer. That is, when the rate of resistance change takes on the maximum value, the angle between the orientations of magnetizations of two adjacent magnetic layers is about 180 deg and the antiferromagnetic coupling energy also takes on the maximum value. In other words, the thickness of each of the nonmagnetic layers 21b to 21g is set so as to maximize the antiferromagnetic coupling energy, whereby the angle between the orientations of magnetizations of two adjacent ones of the magnetic layers 22a to 22g is about 180 deg and the rate of resistance change also increases.

As shown in FIG. 11, the rate of resistance change has a plurality of maximum values in accordance with the thickness of each of the nonmagnetic layers 21b to 21g. The thinner the nonmagnetic layers 21b to 21g are, the larger the maximum value is. In general, it is preferable that the thickness of each of the nonmagnetic layers 21b to 21g is set so as to correspond to the second largest maximum value. If the thickness of each of the nonmagnetic layers 21b to 21g is set so as to correspond to the largest maximum value, antiferromagnetic coupling between two adjacent ones of the magnetic layers 22a to 22g is too intense and thus the sensitivity to the signal magnetic field decreases rather than increases. Specifically, it is preferable that the thickness of each of the nonmagnetic layers 21b to 21g is 1 nm to 3 nm.

As shown in FIG. 8, each of the magnetic layers 22a to 22g is made of, for example, a material containing at least Co in a group consisting of Co, Fe and Ni. Specifically, it is preferable that each of the magnetic layers 22a to 22g is made of $Co_xFe_yNi_z$, where x, y and z are within a range of $10\leq x\leq 80$, $0\leq y\leq 25$ and $0\leq z\leq 85$ in units of at %, respectively. The above-mentioned composition can increase the rate of resistance change of the stack 20 in particular. Each of the magnetic layers 22a to 22g may be made of a material containing at least Ni in a group consisting of Ni, Co, Fe, Cr, Ta, Rh, Mo, Zr and Nb. Specifically, it is preferable that each of the magnetic layers 22a to 22g is made of $[Ni_sCo_tFe_{100-(s+t)}]_{100-u}M_u$, where M represents at least one of Cr, Ta, Rh, Mo, Zr and Nb, and s, t and u are $75\leq s\leq 90$, $0\leq t\leq 15$ and $0\leq u\leq 15$ in units of at %, respectively. The above-mentioned composition can increase resistance of the stack 20 in particular.

Furthermore, each of the magnetic layers 22a to 22g may have a stacked structure comprising a plurality of layers differing from one another in material or composition. In this case, it is preferable that each of the magnetic layers 22a to 22g includes a nickel-containing layer containing at least Ni in a group consisting of Ni, Co, Fe, Cr, Ta, Rh, Mo, Zr and Nb, and a cobalt-containing layer containing at least Co in a group consisting of Co, Fe and Ni. Specifically, it is preferable that each of the magnetic layers 22a to 22g has a stacked structure comprising a cobalt-containing layer made of $Co_xFe_yNi_z$ and a nickel-containing layer made of $[Ni_sCo_tFe_{100-(s+t)}]_{100-u}M_u$, where the element and the ranges of numerical values (at %) indicated by reference symbols M, x, y, z, s, t and u are as described above. In this case, the magnetic layer may have a structure comprising two cobalt-containing layers and a nickel-containing layer sandwiched between the cobalt-containing layers. The structure can increase the resistance as well as the rate of resistance change.

Preferably, each of the magnetic layers 22a to 22g has (111) plane oriented in a direction of stacking (or layering). In the embodiment, the underlayer 21a is made of the above-mentioned material, whereby orientation of the (111) plane of each of the magnetic layers 22a to 22g can be improved.

Preferably, the thickness of each of the magnetic layers 22a to 22g is 1 nm to 6 nm. Although the number of magnetic layers is 7 in an example shown in FIGS. 6 to 10, it is preferable that the number of magnetic layers is within a range of from 2 to 20. When the number of magnetic layers is more than 20, the overall stack 20 becomes too thick and thus the orientations of magnetizations of the magnetic layers vary greatly. When the number of magnetic layers is less than 2, the rate of resistance change cannot be sufficiently increased.

As shown in FIGS. 6 to 10, for example, the stack 20 is divided into a first region 20a and a second region 20b in the direction of stacking. For example, the first region 20a comprises six layers (the underlayer 21a, the magnetic layers 22a to 22c and the nonmagnetic layers 21b and 21c) close to the base 2d, while the second region 20b comprises the remaining eight layers (the magnetic layers 22d to 22g and the nonmagnetic layers 21d to 21g). The number of magnetic layers of each of the first and second regions 20a and 20b has been specifically described above. However, it is preferable that the number of magnetic layers of the first region 20a is from 1 to 10 inclusive and the number of magnetic layers of the second region 20b is from 1 to 10 inclusive. The thickness of the first region 20a is 6 nm to 15 nm, for example. The thickness of the second region 20b is 6 nm to 30 nm, for example.

For example, the first region 20a is substantially cross-shaped on the first shield layer 12. For example, the second region 20b is shaped into a general rectangular parallelepiped on about the center of the first region 20a. For instance, the first region 20a has a projecting portion 20c projecting so as to be near to the air bearing surface 2e, i.e., the magnetic medium 3 located on the side of a signal magnetic field capturing portion, than the second region 20b; an extending portion 20d extending in the direction opposite to the projecting portion 20c; and a pair of wide portions 20e and 20f widened in the direction perpendicular to the direction in which the extending portion 20d extends.

For example, an end surface 20g of the projecting portion 20c extends to the air bearing surface 2e, is exposed to the outside and faces the magnetic medium 3. Thus, the projecting portion 20c functions as a magnetic field capturing portion for capturing the signal magnetic field of the magnetic medium 3. Preferably, a length of the projecting portion 20c along the projecting direction thereof, i.e., a distance between the end surface 20g and the second region 20b is 0.1 μm or less, for example. When the length is more than 0.1 μm, it is difficult to capture the signal magnetic field. As a result, output decreases.

For example, the extending portion 20d extends longer than the first gap layer 31, and the end thereof is in contact with the first shield layer 12. The length of the underlayer 21a in the extending portion 20d is shorter than those of the other five layers (the magnetic layers 22a to 22c and the nonmagnetic layers 21b and 21c). Thus, the magnetic layer 22a is in contact with the first shield layer 12. That is, the stack 20 is magnetically coupled to the first shield layer 12 in the extending portion 20d, whereby the signal magnetic field can be more easily captured. Preferably, the length of the extending portion 20d along the extending direction thereof is 0.1 μm or less, for example. If the length is longer than 0.1 μm, an effect of facilitating capturing the signal magnetic field decreases.

As shown in FIG. 7, a magnetic field capture limiting portion 14a of the second shield layer 14 is provided on a side area of the second region 20b close to the air bearing surface 2e with the insulating layer 13 in between. The magnetic field capture limiting portion 14a is formed of an extending and projecting part of the second shield layer 14. The magnetic field capture limiting portion 14a covers almost all of a side surface of the second region 20b close to the air bearing surface 2e, thereby limiting the capture of the signal magnetic field by the second region 20b through the air bearing surface 2e. That is, the magnetic field capture limiting portion 14a prevents the second region 20b from directly capturing the signal magnetic field of the magnetic medium 3 and thus allows the second region 20b to receive the signal magnetic field captured via the first region 20a. Thus, in the stack 20, the thickness of the first region 20a functioning as the magnetic field capturing portion is reduced, and the thickness of the overall stack 20 is increased. Therefore, the rate of resistance change and the resistance can be increased. The magnetic field capture limiting portion 14a is made of, for example, a magnetic material such as NiFe similarly to the second shield layer 14. The insulating layer 13 is interposed between the magnetic field capture limiting portion 14a and the projecting portion 20c of the first region 20a. The distance between the magnetic field capture limiting portion 14a and the projecting portion 20c is 0.5 nm to 5 nm, for example. The insulating layer 13 has facilities for not only ensuring electrical insulation between the second shield layer 14 and the stack 20 but also shielding magnetic coupling between the second shield layer 14 and the stack 20.

As shown in FIG. 9, a pair of magnetic domain control layers 33 and 34 made of, for example, a hard magnetic material (the so-called permanent magnet) is provided between the wide portions 20e and 20f of the first region 20a and the insulating layer 13 with the second region 20b sandwiched between the magnetic domain control layers 33 and 34 in the direction perpendicular to the direction of stacking. The magnetic domain control layers 33 and 34 prevent variation in the orientations of magnetizations of the magnetic layers 22a to 22g and thus prevent so-called Barkhausen noise. For example, CoPt (cobalt-platinum alloy) or CoPtCr (cobalt-platinum-chromium alloy) is used as the hard magnetic material. The magnetic domain control layers 33 and 34 are separated from the second region 20b, and the insulating layer 13 is interposed between the magnetic domain control layers 33 and 34 and the second region 20b. This is because the passage of current through the stack 20 reduces the current passing through the stack 20 by the current passing through the stack 20 and thus reduces the rate of resistance change. Preferably, the thickness of each of the magnetic domain control layers 33 and 34 is 5 nm to 50 nm, for example.

The magnetic domain control layers 33 and 34 may have a stacked structure comprising a ferromagnetic film and an antiferromagnetic film. In this case, an exchange coupling magnetic field is induced on the interface between the ferromagnetic film and the antiferromagnetic film. Thus, the exchange coupling magnetic field matches the orientations of magnetizations of the magnetic layers 22a to 22g to one another. Preferably, the ferromagnetic film for use in this case is made of, for example, NiFe or a magnetic material made of Ni, Fe and Co. The ferromagnetic film may have a stacked structure comprising an NiFe film and a Co film. The antiferromagnetic film may be made of a heat-treatment type antiferromagnetic material for inducing the exchange coupling magnetic field between a ferromagnetic material and an antiferromagnetic material by heat treatment, or a non-heat-treatment type antiferromagnetic material for inducing the exchange coupling magnetic field between the ferromagnetic material and the antiferromagnetic material even without heat treatment. Non-heat-treatment type antiferromagnetic materials include Mn alloy having γ-phase, and so on.

Specifically, RuRhMn (ruthenium-rhodium-manganese alloy), FeMn (iron-manganese alloy), IrMn (iridium-manganese alloy) and the like are included. Heat-treatment type antiferromagnetic materials include Mn alloy having regular crystal structures, and so on. Specifically, PtMn (platinum-manganese alloy), NiMn (nickel-manganese alloy), PtRhMn (platinum-rhodium-manganese alloy) and the like are included.

For example, as shown in FIGS. 3 and 5, the recording head 1b has a bottom pole 41 of 0.5 μm to 3 μm thick made of a magnetic material such as NiFe on the insulating layer 15 of the reproducing head 1a. A write gap layer 42 of 0.05 μm to 0.3 μm thick made of an insulating film such as $Al_2O_3$ is formed on the bottom pole 41. The write gap layer 42 has an opening 42a at the position corresponding to the center of thin film coils 44 and 46 to be described later. An insulating layer 43 made of $Al_2O_3$ or the like and having a thickness of 1.0 μm to 5.0 μm for determining a throat height is formed on the write gap layer 42. The thin film coils 44 of 1 μm to 3 μm thick and a photoresist layer 45 for coating the thin film coils 44 are formed on the insulating layer 43. The thin film coils 46 of 1 μm to 3 μm thick and a photoresist layer 47 for coating the thin film coils 46 are formed on the photoresist layer 45. In the embodiment, the description is given with regard to an example in which two thin film coil layers are stacked. However, the number of thin film coil layers may be one, or three or more.

A top pole 48 of about 3 μm thick made of a magnetic material having high saturation magnetic flux density, such as NiFe or FeN (iron nitride), is formed on the write gap layer 42, the insulating layer 43 and the photoresist layers 45 and 47. The top pole 48 is in contact with and magnetically coupled to the bottom pole 41 through the opening 42a of the write gap layer 42 located at the position corresponding to the center of the thin film coils 44 and 46. Although not shown in FIGS. 3 to 5, an overcoat layer (an overcoat layer 49 shown in FIG. 15) of 20 μm to 30 m thick made of, for example, $Al_2O_3$ is formed on the top pole 48 so as to coat the overall surface. In the embodiment, a multilayer structure from the bottom pole 41 to the overcoat layer corresponds to the recording head 1b. The recording head 1b generates a magnetic flux between the bottom pole 41 and the top pole 48 by a current passing through the thin film coils 44 and 46 and magnetizes the magnetic medium 3 by the magnetic flux generated near the write gap layer 42, thereby recording information.

<Operation of MR Element and Thin Film Magnetic Head>

Next, a reproducing operation of the MR element 110 and the thin film magnetic head 1 having the above-described structures will be described with reference to FIGS. 6 and 7.

In the thin film magnetic head 1, information recorded on the magnetic medium 3 is read out by the reproducing head 1a. In the stack of the reproducing head 1a, the angle between the orientations of magnetizations of two adjacent ones of the magnetic layers adjacent to each other with each of the nonmagnetic layers in between is 90 deg or more (e.g., from 100 deg to 260 deg inclusive). Variation in the orientations of magnetizations of the magnetic layers 22a to 22g is prevented by a bias magnetic field generated by the magnetic domain control layers 33 and 34.

In reading out information, a current is passed through the stack 20 in the direction of stack through the first shield layer 12 and the second shield layer 14. The current passes through the first shield layer 12, the first gap layer 31, the stack 20, the second gap layer 32 and the second shield layer 14 in this order, or the current passes in reverse order.

The magnetic flux of the signal magnetic field of the magnetic medium 3 (see FIG. 1) enters into the first region 20a through the projecting portion 20c. A part of the magnetic flux reaches the second region 20b via the first region 20a. That is, the projecting portion 20c captures the signal magnetic field, and the captured signal magnetic field extends throughout the first region 20a and the second region 20b. The signal magnetic field causes change in the orientations of magnetizations of the magnetic layers 22a to 22g of the first region 20a and the second region 20b. Thus, electrical resistance of the stack 20 changes. The change in electrical resistance is detected as the amount of change in voltage between the first shield layer 12 and the second shield layer 14. Thus, the signal magnetic field of the magnetic medium 3 is detected. In other words, information recorded on the magnetic medium 3 is read out.

The signal magnetic field is captured by the projecting portion 20c of the stack 20. Thus, erroneous detection of adjacent signal magnetic fields is prevented. In addition, the magnetic field capture limiting portion 14a is provided on the side area of the second region 20b close to the signal magnetic field. This ensures that the capture of the signal magnetic field is limited and therefore ensures that erroneous detection of adjacent signal magnetic fields is prevented.

Moreover, a part of the signal magnetic field passes through the extending portion 20d of the first region 20a and to the first shield layer 12. Thus, the magnetic flux path extending from the end surface 20g of the projecting portion 20c toward the extending portion 20d is formed. Therefore, the signal magnetic field easily extends throughout the first region 20a and the second region 20b. Accordingly, the rate of resistance change further improves.

Additionally, the underlayer 21a is made of a material containing Ni and Cr. Thus, the smoothness of the interfaces between the nonmagnetic layers 21b to 21g and the magnetic layers 22a to 22g improves, and the crystallizability of the magnetic layers improves.

≦Method of Manufacturing MR Element and Thin Film Magnetic Head>

Next, a method of manufacturing the MR element 110 and the thin film magnetic head 1 will be briefly described with reference to FIG. 6 and FIGS. 12A–12C through 15. FIGS. 12A–12C through 15 show a sectional structure in the same cross section as a cross section taken along the line VII—VII of FIG. 6.

Figure 12A:
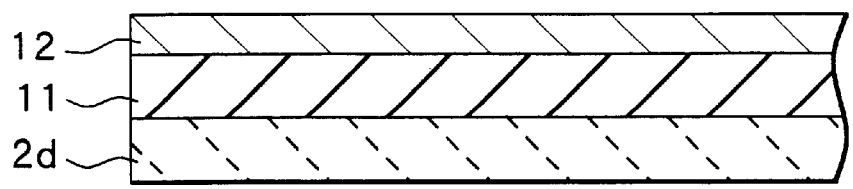
FIGS. 12A to 12C are sectional views for describing a step of a method of manufacturing the thin film magnetic head shown in FIG. 7.
Figure 12B:
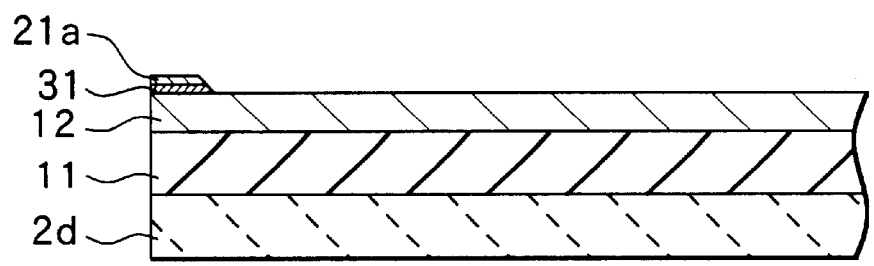

In the method of manufacturing according to the embodiment, first, as shown in FIG. 12A, for example, the insulating layer 11 is formed on one side of the base 2d made of $Al_2O_3$—TiC by sputtering using the material mentioned in the description of the structure. Then, the first shield layer 12 is formed on the insulating layer 11 by, for example, plating using the material mentioned in the description of the structure. Subsequently, as shown in FIG. 12B, the first gap layer 31 and the underlayer 21a are deposited in sequence on the first shield layer 12 by, for example, sputtering using the material mentioned in the description of the structure. Then, the first gap layer 31 and the underlayer 21a are patterned by photolithography using, for example, i-rays, KrF (krypton fluoride) and ArF (argon fluoride).

Figure 12C:
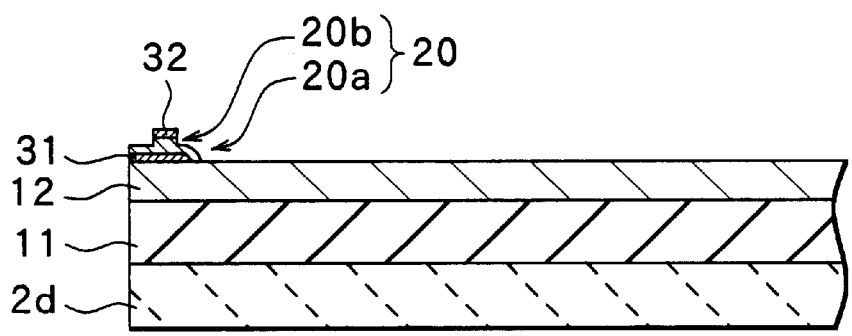

After patterning the first gap layer 31 and the underlayer 21a, as shown in FIG. 12C, the magnetic layers 22a to 22g and the nonmagnetic layers 21b to 21g are alternately deposited on the first gap layer 31 by sputtering, for example. Then, the second gap layer 32 is deposited on the magnetic layer 22g. The respective materials of the magnetic layer, the nonmagnetic layer and the second gap layer 32 are as mentioned in the description of the structure. After that, a resist mask of a predetermined pattern is formed by, for example, electron beam lithography, and milling is performed by, for example, ion milling. The first region 20a, the second region 20b and the second gap layer 32 are formed by controlling a depth of milling. Subsequently, the magnetic domain control layers 33 and 34 are selectively formed on the first region 20a by, for example, sputtering using the material mentioned in the description of the structure.

Figure 13A:
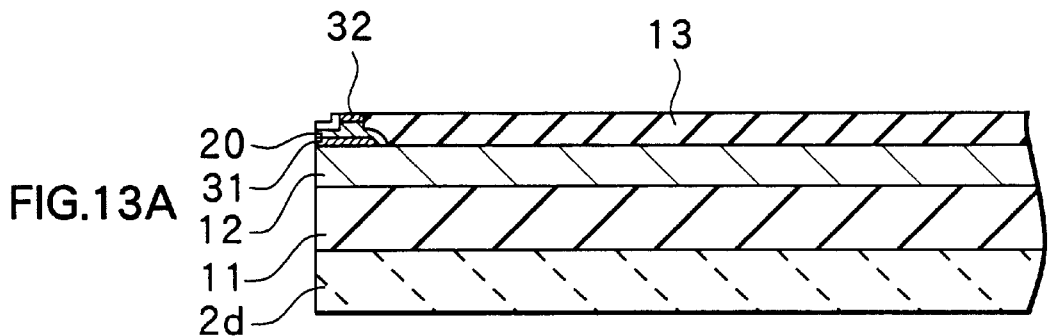
FIGS. 13A and 13B are sectional views for describing a step following the step of FIGS. 12A to 12C.

After forming the magnetic domain control layers 33 and 34, as shown in FIG. 13A, the insulating layer 13 is selectively formed by, for example, sputtering using the material mentioned in the description of the structure so as to coat the surface of the first shield layer 12, the stack 20 and the magnetic domain control layers 33 and 34 and to expose the surface of the second gap layer 32.

Figure 13B:
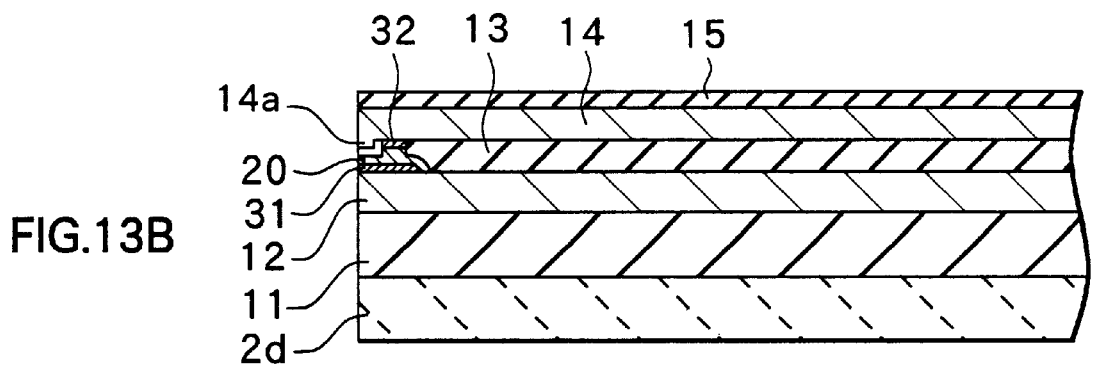
Figure 14A:
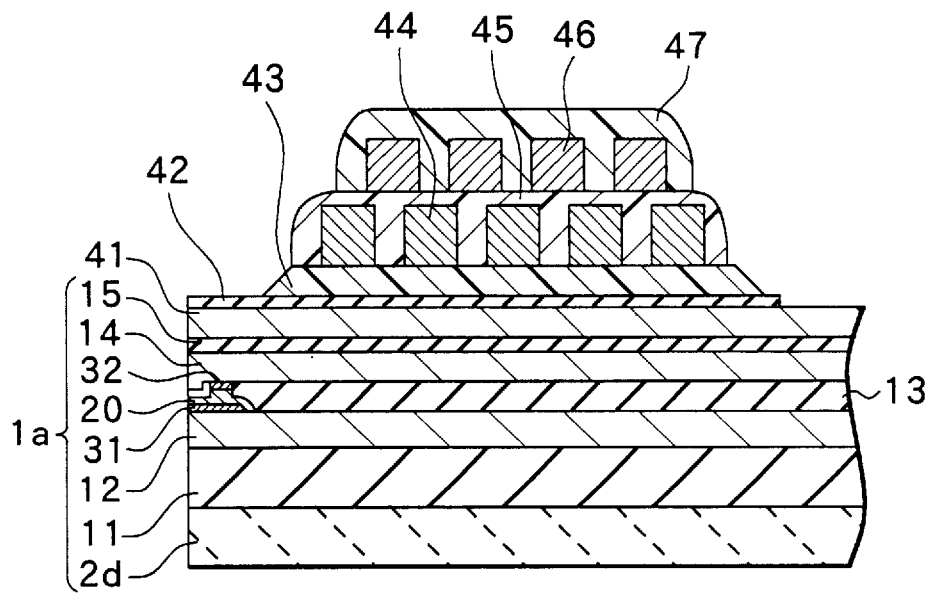
FIGS. 14A and 14B are sectional views for describing a step following the step of FIGS. 13A and 13B.

After forming the insulating layer 13, for example, as shown in FIG. 13B, the second shield layer 14 is deposited on the insulating layer 13 by, for example, sputtering using the material mentioned in the description of the structure. At this time, the deposition of the second shield layer 14 fills in a recess naturally formed at the time of forming the insulating layer 13. Thus, the recess filled with the second shield layer 14 is the magnetic field capture limiting portion 14a. After that, the insulating layer 15 is deposited on the second shield layer 14 by, for example, sputtering using the material mentioned in the description of the structure. After forming the insulating layer 15, as shown in FIG. 14A, the bottom pole 41 is deposited on the insulating layer 15 by, for example, sputtering using the material mentioned in the description of the structure. Then, the write gap layer 42 is formed on the bottom pole 41 by sputtering, for example. Then, the insulating layer 43 is formed into a predetermined pattern on the write gap layer 42. After forming the insulating layer 43, the thin film coils 44 are formed on the insulating layer 43 by using the material mentioned in the description of the structure. Then, the photoresist layer 45 is formed into a predetermined pattern so as to coat the thin film coils 44. After forming the photoresist layer 45, the thin film coils 46 are formed on the photoresist layer 45 by using the material mentioned in the description of the structure. Then, the photoresist layer 47 is formed into a predetermined pattern so as to coat the thin film coils 46.

Figure 14B:
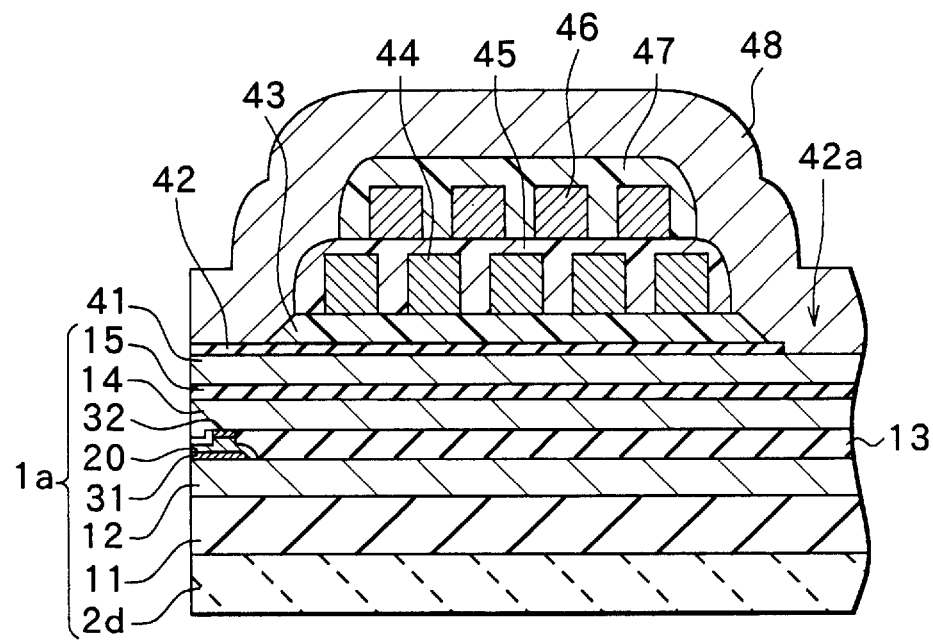
Figure 15:
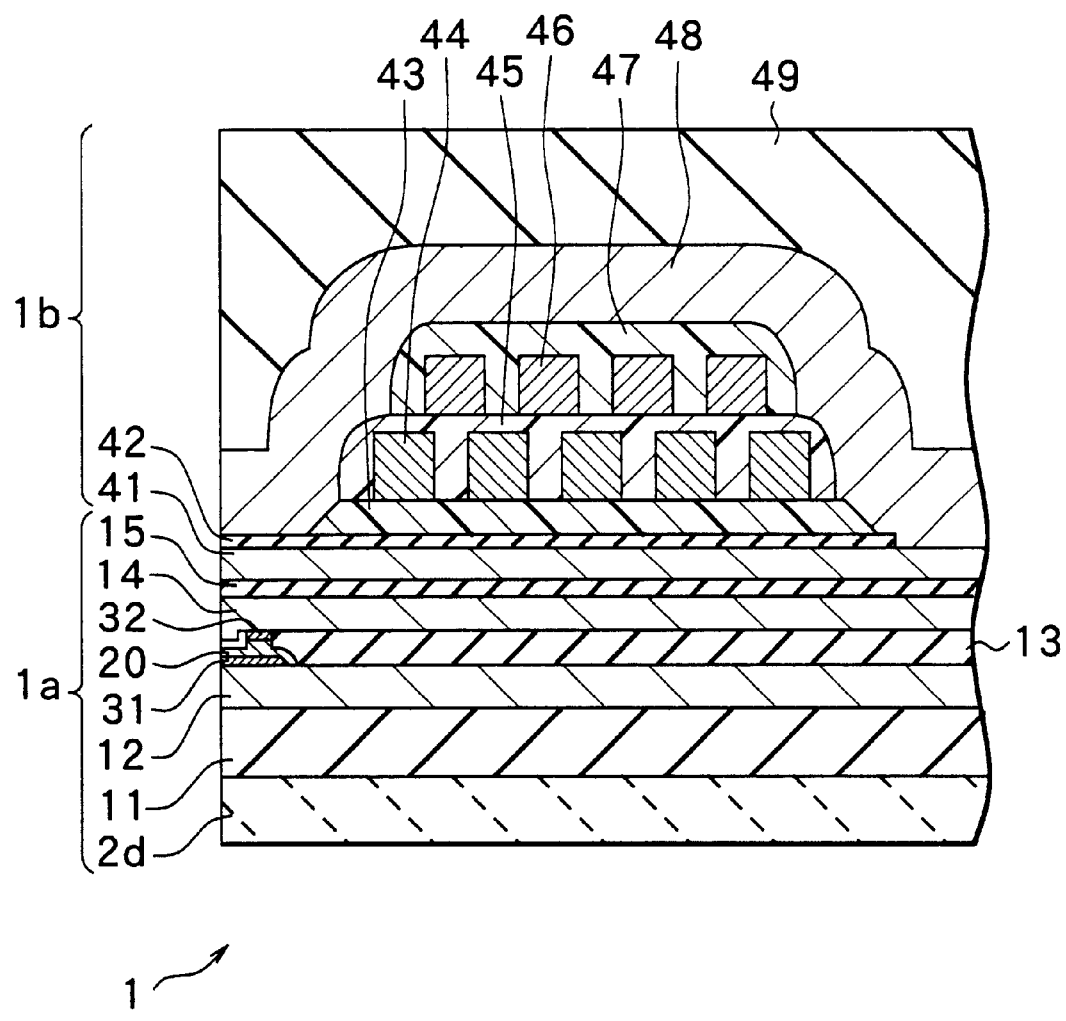
FIG. 15 is a sectional view for describing a step following the step of FIGS. 14A and 14B.

After forming the photoresist layer 47, as shown in FIG. 14B, for example, the write gap layer 42 is partially etched at the position corresponding to the center of the thin film coils 44 and 46, whereby the opening 42a for forming a magnetic path is formed. After that, for example, the top pole 48 is formed on the write gap layer 42, the opening 42a, the insulating layer 43 and the photoresist layers 45 and 47 by using the material mentioned in the description of the structure. After forming the top pole 48, for example, the write gap layer 42 and the bottom pole 41 are selectively etched by ion milling using the top pole 48 as a mask. After that, as shown in FIG. 15, the overcoat layer 49 is formed on the top pole 48 by using the material mentioned in the description of the structure. Finally, for example, the air bearing surface is formed by machining the slider 2a. As a result, the thin film magnetic head 1 is completed.

The magnetic domain control layers 33 and 34 may be formed in a manner of replacing a hard magnetic film with the ferromagnetic film and the antiferromagnetic film. In this case, when the antiferromagnetic film is made of the heat-treatment type antiferromagnetic material, heat treatment takes place in order to induce exchange coupling between the ferromagnetic film and the antiferromagnetic film. Specifically, the thin film magnetic head 1 is heated at about 200° C. to 300° C. for 1 hour to 5 hours with the magnetic field applied in a fixed direction by utilizing a magnetic field generating apparatus or the like, for example. Thus, the orientation of magnetization of the ferromagnetic film is fixed in the direction of the applied magnetic field, and therefore the bias magnetic field is generated. On the other hand, when the antiferromagnetic film is made of the non-heat-treatment type antiferromagnetic material, heat treatment for the heat-treatment type antiferromagnetic material is unnecessary. In this case, the magnetic domain control layers 33 and 34 are deposited with the magnetic field applied in a predetermined direction, whereby the bias magnetic field is generated in the direction of the applied magnetic field.

<Effects of First Embodiment>

As described above, according to the embodiment, the signal magnetic field of the magnetic medium 3 is captured by the projecting portion 20c of the stack 20. Thus, the number of magnetic layers of the stack 20 can be increased without increasing the length of the surface facing the magnetic medium 3. It is therefore possible to increase the rate of resistance change and the resistance while preventing erroneous detection of adjacent signal magnetic fields. In other words, properties adapting to ultra-high density can be obtained.

More particularly, the distance between the end surface 20g of the projecting portion 20c and the second region 20b is 0.1 $\mu$m or less, whereby the signal magnetic field reliably extends to the second region 20b. Thus, the signal magnetic field can be reliably captured. In the stack 20, the magnetic domain control layers 33 and 34 are formed on the first region 20a, whereby a magnetic domain of the stack 20 is easily controlled by the magnetic domain control layers 33 and 34.

Furthermore, a current is passed in the direction of stacking of the stack 20, whereby the rate of resistance change and the resistance can be further increased, as compared to the case in which a current is passed parallel to a layer surface. In addition, a current is passed through the stack 20 through the shield layers 12 and 14 and the gap layers 31 and 32, whereby it is not necessary to form an additional lead layer and therefore manufacturing costs are reduced.

Moreover, at least one of the magnetic layers 22a to 22g is made of a material containing at least Co in a group consisting of Co, Fe and Ni or a material containing at least Ni in a group consisting of Ni, Co, Fe, Cr, Ta, Rh, Mo, Zr and Nb, whereby the rate of resistance change or the resistance can be increased. Additionally, each of the magnetic layers 22a to 22g includes a cobalt-containing layer made of a material containing at least Co in a group consisting of Co, Fe and Ni and a nickel-containing layer made of a material containing at least Ni in a group consisting of Ni, Co, Fe, Cr, Ta, Rh, Mo, Zr and Nb, whereby both the rate of resistance change and the resistance can be increased. Furthermore, the number of magnetic layers is from 2 to 20 inclusive, whereby variation in the orientations of magnetizations can be prevented.

Moreover, the thickness of each of the nonmagnetic layers 21b to 21g is set so as to maximize antiferromagnetic coupling between two magnetic layers adjacent to a nonmagnetic layer, whereby the rate of resistance change can be increased. Moreover, the antiferromagnetic coupling energy is within a range of from $0.1 \times 10^{-4}$ J/m$^2$ to $2.0 \times 10^{-4}$ J/m$^2$, whereby the rate of resistance change can be increased without reducing the sensitivity.

Furthermore, at least one of the nonmagnetic layers 21b to 21g is made of a material containing at least one element in a group consisting of Au, Ag, Cu, Ru, Rh, Re, Pt and W, whereby antiferromagnetic coupling can occur between two magnetic layers adjacent to a nonmagnetic layer. Furthermore, at least one of the nonmagnetic layers 21b to 21g is made of a material containing Ni and Cr, whereby the rate of resistance change can be increased and the thermal stability can be improved. More particularly, the underlayer 21a is made of a material containing Ni and Cr, whereby the rate of resistance change can be further increased and the thermal stability can be further improved.

Furthermore, the magnetic field capture limiting portion 14a is provided in the area corresponding to a part of the stack 20 close to the magnetic medium 3. Thus, the capture of the signal magnetic field by the stack 20 is limited by a part of the stack 20, whereby erroneous detection of adjacent signal magnetic fields can be more reliably prevented. Moreover, the stack 20 is in contact with the first shield layer 12 in the extending portion 20d, whereby the signal magnetic field can be more effectively captured and therefore the rate of resistance change can be further increased.

Second Embodiment

Figure 16:
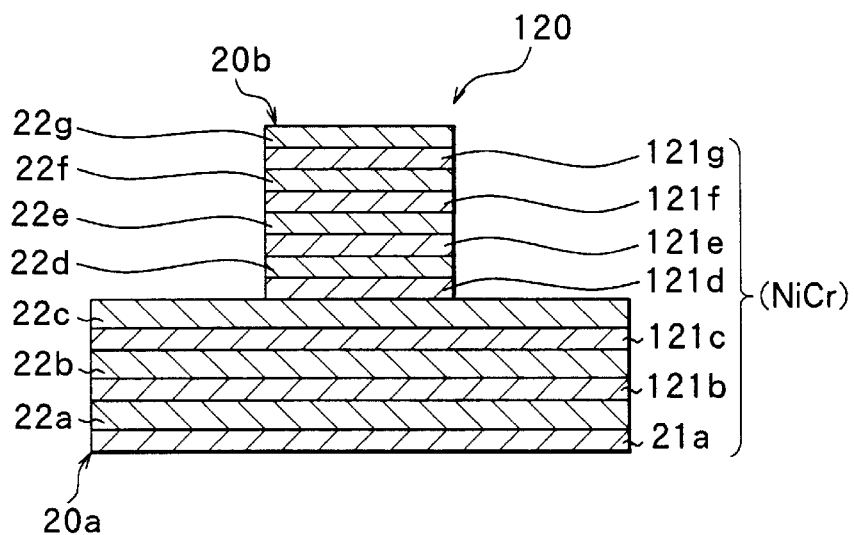
FIG. 16 is a sectional view of a stack of a thin film magnetic head according to a second embodiment.

Next, a second embodiment of the invention will be described with reference to FIG. 16. A thin film magnetic head according to the second embodiment is the same as the thin film magnetic head according to the first embodiment except that nonmagnetic layers 121b to 121g of a stack 120 are made of other materials. Accordingly, only the stack 120 is shown in FIG. 16. The same structural components as the structural components of the first embodiment are indicated by the same reference numerals, and the detailed description thereof is omitted.

In the stack 120 of the embodiment, it is preferable that the nonmagnetic layers 121b to 121g are made of a material containing Ni and Cr. Specifically, it is preferable that the nonmagnetic layers 121b to 121g are made of $(Ni_aCr_{100-a})_bA_{100-b}$ similarly to the underlayer 21a, where A, a and b are as mentioned in the description of the first embodiment. The composition of each of the nonmagnetic layers 121b to 121g may be identical with or different from the composition of the underlayer 21a.

According to the embodiment, the nonmagnetic layers 121b to 121g are made of a material containing Ni and Cr. Thus, diffusion of the structural components between the magnetic layers 22a to 22g and the nonmagnetic layers 121b to 121g can be prevented. Therefore, the thermal stability can be further improved.

In the embodiment, all of the nonmagnetic layers 121b to 121g are made of a material containing Ni and Cr. However, at least one of the nonmagnetic layers 121b to 121g may be made of a material containing Ni and Cr.

Third Embodiment

Figure 17:
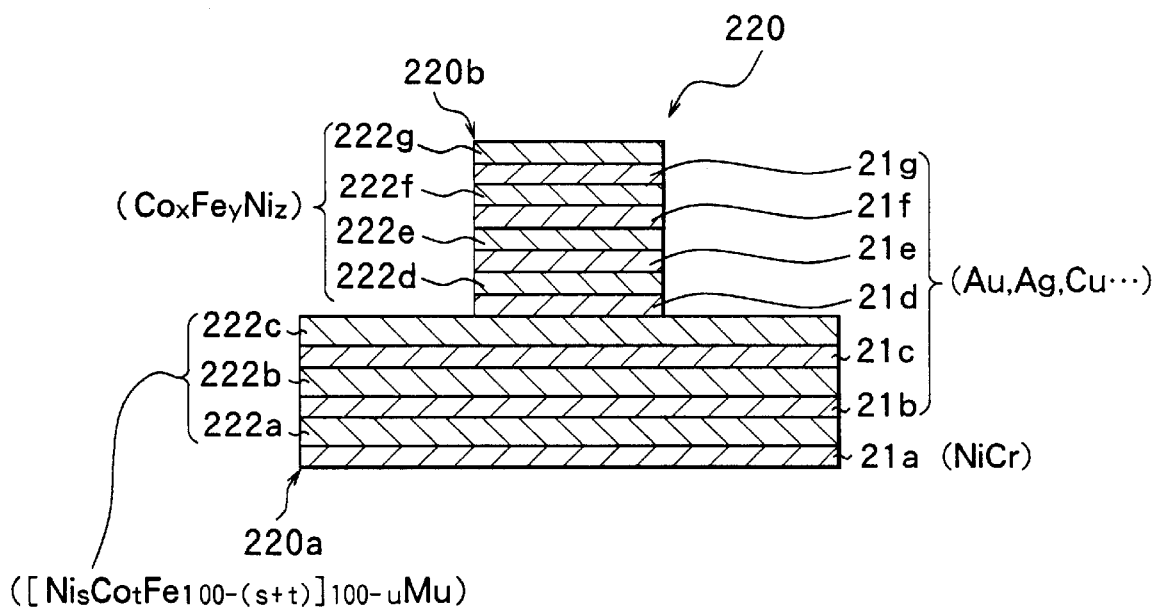
FIG. 17 is a sectional view of a stack of a thin film magnetic head according to a third embodiment.

Next, a third embodiment of the invention will be described with reference to FIG. 17. A thin film magnetic head according to the third embodiment is the same as the thin film magnetic head according to the first embodiment except that the material or composition of magnetic layers 222a to 222c included in a first region 220a of a stack 220 differs from the material or composition of magnetic layers 222d to 222g included in a second region 220b. Accordingly, only the stack 220 is shown in FIG. 17.

Preferably, the magnetic layers 222a to 222c of the first region 220a are made of, for example, a material containing at least Ni in a group consisting of Ni, Co, Fe, Cr, Ta, Rh, Mo, Zr and Nb. Specifically, it is preferable that the magnetic layers 222a to 222c are made of $[Ni_sCo_tFe_{100-(s+t)}]_{100-u}M_u$, where s, t and u are as mentioned in the description of the first embodiment.

Preferably, the magnetic layers 222d to 222g of the second region 220b are made of, for example, a material containing at least Co in a group consisting of Co, Fe and Ni. Specifically, it is preferable that the magnetic layers 222d to 222g are made of $Co_xFe_yNi_z$, where x, y and z are as mentioned in the description of the first embodiment.

According to the embodiment, the magnetic layers 222a to 222c included in the first region 220a and the magnetic layers 222d to 222g included in the second region 220b are made of the above-described materials. Therefore, both the resistance and the rate of resistance change can be increased.

In the embodiment, the nonmagnetic layers 21b to 21g are made of a material containing at least one element in a group consisting of Au, Ag, Cu, Ru, Rh, Re, Pt and W. However, the nonmagnetic layers 21b to 21g may be made of a material containing Ni and Cr.

Fourth Embodiment

Figure 18:
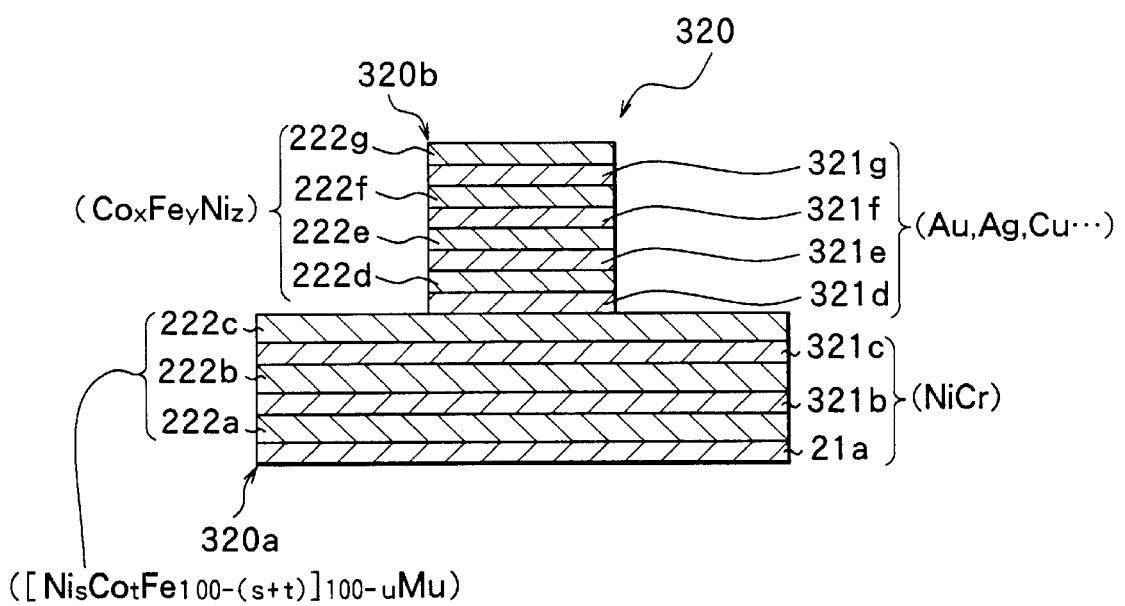
FIG. 18 is a sectional view of a stack of a thin film magnetic head according to a fourth embodiment.

Next, a fourth embodiment of the invention will be described with reference to FIG. 18. A thin film magnetic head according to the fourth embodiment is the same as the thin film magnetic head according to the third embodiment except that the material or composition of nonmagnetic layers 321b and 321c included in a first region 320a of a stack 320 differs from the material or composition of nonmagnetic layers 321d to 321g included in a second region 320b. Accordingly, only the stack 320 is shown in FIG. 18.

In the stack 320 of the embodiment, it is preferable that the nonmagnetic layers 321b and 321c included in the first region 320a are made of a material containing Ni and Cr. Specifically, it is preferable that the nonmagnetic layers 321b and 321c are made of $(Ni_aCr_{100-a})_bA_{100-b}$, where A, a and b are as mentioned in the description of the first embodiment. The composition of each of the nonmagnetic layers 321b and 321c may be identical with or different from the composition of the underlayer 21a.

Preferably, the nonmagnetic layers 321d to 321g included in the second region 320b are made of metal containing at least one element in a group consisting of Au, Ag, Cu, Ru, Rh, Re, Pt and W, and the percentage of content of the at least one element is 60 at % or more.

According to the embodiment, the nonmagnetic layers 321b and 321c are made of a material containing Ni and Cr, and the nonmagnetic layers 321d to 321g are made of a material containing at least one element in a group consisting of Au, Ag, Cu, Ru, Rh, Re, Pt and W. Therefore, the rate of resistance change can be increased, and the thermal stability can be improved.

EXAMPLE

Specific examples of the invention will be described in detail.

Examples 1 to 5

The thin film magnetic heads 1 shown in FIGS. 5 to 10 were prepared as examples 1 to 5. First, the insulating layer 11 of 3 nm thick was deposited on the base 2d made of $Al_2O_3$—TiC by sputtering using $Al_2O_3$. The first shield layer 12 of 2 nm thick was formed on the insulating layer 11 by plating using NiFe. Then, the first gap layer 31 of 10 nm thick was deposited by sputtering using Ta. The underlayer 21a of 5 nm thick was deposited on the first gap layer 31 by using $Ni_{58}Cr_{42}$. After that, the first gap layer 31 and the underlayer 21a were patterned by i-rays photolithography.

Subsequently, the magnetic layers and the nonmagnetic layers for constituting the stack 20 were alternately deposited on the underlayer 21a. The second gap layer 32 was formed on the stack 20. In this case, the respective materials and thicknesses of the magnetic layer and the nonmagnetic layer were set as shown in Table 1. The number of magnetic layers of the first region 20a and the number of magnetic layers of the second region 20b are shown in Table 1. The material of the second gap layer 32 was Ta, and the thickness thereof was 3 nm.

As described above by referring to the aforementioned embodiments, the first region 20a had the projecting portion 20c, the extending portion 20d and the wide portions 20e and 20f, and the magnetic layers were brought into contact with the first shield layer 12 in a part of the extending portion 20d. The width (MR track width) of the end surface 20g of the first region 20a along the direction perpendicular to a direction of stacking, the length (MR height) of the second region 20b along the direction perpendicular to the air bearing surface 2e and the length of the projecting portion 20c were set as shown in Table 2.

TABLE 1

|  |  | Magnetic layer | | Nonmagnetic layer | | Number of layers |
|---|---|---|---|---|---|---|
|  |  | Material | Thickness (nm) | Material | Thickness (nm) |  |
| First region |
| Example | 1 | $Co_{80}Fe_{10}Ni_{10}$ | 1.8 | Cu | 2.0 | 4 |
|  | 2 | $Co_{80}Fe_{10}Ni_{10}$ | 1.8 | $Ni_{60}Cr_{40}$ | 1.8 | 4 |
|  | 3 | $Ni_{75}Co_{10}Fe_{10}Cr_5$ | 2.0 | Cu | 2.0 | 3 |
|  | 4 | $Ni_{75}Co_{10}Fe_{10}Cr_5$ | 3.0 | $Ni_{60}Cr_{40}$ | 2.2 | 1 |
|  | 5 | $Ni_{75}Co_{10}Fe_{10}Cr_5$ | 3.0 | $Ni_{60}Cr_{40}$ | 2.2 | 1 |
| Comparison | 1 | $Co_{80}Fe_{10}Ni_{10}$ | 1.8 | Cu | 2.0 | 4 |
|  | 2 | $Co_{80}Fe_{10}Ni_{10}$ | 1.8 | Cu | 2.0 | 4 |
| Second region |
| Example | 1 | $Co_{80}Fe_{10}Ni_{10}$ | 1.8 | Cu | 2.0 | 10 |
|  | 2 | $Co_{80}Fe_{10}Ni_{10}$ | 1.8 | $Ni_{60}Cr_{40}$ | 1.8 | 10 |
|  | 3 | $Co_{80}Fe_{10}Ni_{10}$ | 1.8 | Cu | 2.0 | 10 |
|  | 4 | $Co_{80}Fe_{10}Ni_{10}$ | 2.0 | $Ni_{60}Cr_{40}$ | 1.8 | 10 |
|  | 5 | $Co_{80}Fe_{10}Ni_{10}$ | 2.0 | Cu | 2.0 | 10 |
| Comparison | 1 | Not formed | — | Not formed | — | — |
|  | 2 | $Co_{80}Fe_{10}Ni_{10}$ | 1.8 | Cu | 2.0 | 10 |

TABLE 2

|  |  | MR track width (μm) | MR height (μm) | Measured current (mA) | Length of projecting portion (μm) |
|---|---|---|---|---|---|
| Example | 1 | 0.10 | 0.05 | 5.0 | 0.05 |
|  | 2 | 0.10 | 0.05 | 5.0 | 0.05 |
|  | 3 | 0.10 | 0.05 | 5.0 | 0.05 |
|  | 4 | 0.10 | 0.05 | 5.0 | 0.05 |
|  | 5 | 0.10 | 0.05 | 5.0 | 0.05 |
| Comparison | 1 | 0.10 | 0.05 | 5.0 | — |
|  | 2 | 0.10 | 0.05 | 5.0 | 0.05 |

|  |  |  |  | Heat test | |
|---|---|---|---|---|---|
|  |  | Standardized output (μV/μm) | COV (%) | Standardized output after heat test (μV/μm) | Rate of heat deterioration (%) |
| Example | 1 | 13800 | 0.8 | 12900 | −6.5 |
|  | 2 | 10200 | 0.8 | 9800 | −3.9 |
|  | 3 | 24300 | 0.7 | 23100 | −4.9 |
|  | 4 | 11600 | 0.8 | 11000 | −4.3 |
|  | 5 | 26700 | 0.7 | 25300 | −5.2 |
| Comparison | 1 | 6500 | 0.9 | 6000 | −7.7 |
|  | 2 | 9800 | 0.4 | 9100 | −7.1 |

After forming the stack 20, the magnetic domain control layers 33 and 34 each having a thickness of 15 nm were formed on the wide portions 20e and 20f of the first region 20a by sputtering using CoPtCr. Then, the insulating layer 13 of 40 nm thick was formed on the base 2d by sputtering using $Al_2O_3$. The second shield layer 14 of 3 μm thick having the magnetic field capture limiting portion 14a was deposited on the insulating layer 13 by sputtering using NiFe. Subsequently, the recording head 1b was formed on the second shield layer 14 with the insulating layer 15 in between. Thus, the thin film magnetic heads 1 of the examples 1 to 5 were obtained. A method of manufacturing the recording head 1b of the examples is omitted because of little influence on reproducing properties.

While a current was passed through the stack 20 of each of the obtained thin film magnetic heads 1 of the examples 1 to 5, an external signal magnetic field was applied to the stack 20. In this state, the properties of each thin film magnetic head 1, i.e., standardized output, an output covariant value (COV) and the rate of heat deterioration obtained through a heat test were determined. The standardized output corresponds to head output in a unit length of the track width. The output covariant value is calculated in the following manner: a standard deviation σ (sigma) of variation in head output values obtained at the time of repeating recording and reproducing 100 times is divided by an average of head outputs. The heat test corresponds to heat treatment at 130° C. for 100 hours. The rate of heat deterioration corresponds to the rate of decrease in the standardized output after the heat test to the standardized output before the heat test. A measured current was set at 5 mA. The results are shown in Table 2.

The thin film magnetic head was prepared as a comparison 1 to the examples under the same conditions as the conditions for the example 1 except that the second region of the stack and the magnetic field capture limiting portion of the second shield layer were not provided. Moreover, the thin film magnetic head was prepared as a comparison 2 to the examples under the same conditions as the conditions for the example 1 except that the extending portion was not formed in the first region of the stack and that the stack 20 was not brought into contact with the first shield layer 12. The properties of the comparisons 1 and 2, i.e., the standardized output, the output covariant value and the rate of heat deterioration obtained through the heat test were examined in the same manner as the examples. The results are also shown in Table 2.

As can be seen from Table 2, the standardized output of the examples was 10000 μV/μm or more, which was more than the standardized output of the comparisons 1 and 2. Moreover, the examples obtained the better output covariant value and rate of heat deterioration. In other words, it turns out that the stack 20 has the projecting portion 20c, the magnetic field capture limiting portion 14a is provided at the position corresponding to a part of the stack 20, or the stack 20 is partially brought into contact with the first shield layer 12, whereby higher standardized output can be obtained and the other properties can be made better.

When the example 1 was compared to the example 2, the example 1 exhibited the higher standardized output and the example 2 exhibited the better rate of heat deterioration. From the result of comparison, it turns out that the use of the nonmagnetic layer containing Cu causes increase in the resistance and that the use of the nonmagnetic layer containing NiCr causes improvement in the rate of heat deterioration. When the example 1 was compared to the example 3, the example 3 exhibited the higher standardized output. Therefore, it turns out that the use of the magnetic layer made of a material containing at least Ni causes increase in the resistance. When the examples 3 to 5 were compared to one another, the example 3 exhibited the highest standardized output and the example 5 exhibited the best rate of heat deterioration. The example 4 exhibited both the standardized output and the rate of heat deterioration, which were intermediate between the examples 3 and 5. From the result of comparison, it turns out that the rate of heat deterioration becomes better as the number of nonmagnetic layers containing NiCr is increased and that the resistance becomes higher as the number of nonmagnetic layers containing Cu is increased.

The above-mentioned examples have been specifically described by referring to some examples. However, the thin film magnetic heads having other structures can obtain the same result in the following manner: the stack has the projecting portion projecting toward the magnetic medium; the magnetic field capture limiting portion is provided at the position corresponding to a part of the stack; or the stack is partially brought into contact with at least one of the shield layers.

Although the invention has been described above by referring to the embodiments and examples, the invention is not limited to the embodiments and examples and various modifications of the invention are possible. For example, in the above-mentioned embodiments, the description has been given with regard to the thin film magnetic head having all of the following three structures: a structure in which the stack 20 has the projecting portion 20c; a structure in which the capture of the signal magnetic field by the stack 20 is limited by the magnetic field capture limiting portion 14a; and a structure in which the stack 20 is in contact with at least one of the shield layers. However, the thin film magnetic head may have any one of these three structures.

The magnetic field capture limiting portion 14a is provided in the second shield layer 14. However, the magnetic field capture limiting portion 14a may be provided in the first shield layer 12 or both the first shield layer 12 and the second shield layer 14. In the above-described embodiments, the stack 20 is in contact with the first shield layer 12. However, the stack 20 may be in contact with the second shield layer 14 or both the first shield layer 12 and the second shield layer 14.

In the above-described embodiments, the first region 20a and the second region 20b are stacked in this order on the base 2d. However, the second region 20b and the first region 20a may be stacked in this order on the base 2d. In this case, the nonmagnetic layer located on the outermost side of the second region 20b is used as the underlayer. That is, the nonmagnetic layer located on one outermost side of the stack is used as the underlayer.

The stacks 20 120, 220 and 320 have a stacked structure starting with the nonmagnetic layer. However, the stack may have a stacked structure starting with the magnetic layer. In the above-described embodiments, the stack has the underlayer. However, the stack may have no underlayer. In this case, it is preferable that at least one of the nonmagnetic layers is made of a material containing Ni and Cr. More preferably, the nonmagnetic layer to be deposited at the earlier time of manufacture is made of a material containing Ni and Cr.

In the above-described embodiments, the underlayer or at least one of the nonmagnetic layers contains Ni and Cu. However, neither of the underlayer and the nonmagnetic layers may contain Ni and Cu. However, the stack may have a stacked structure starting with the magnetic layer. In the fourth embodiment, the first region differs from the second region in the material or composition of the magnetic layers and the nonmagnetic layers. However, the first region may differ from the second region in the material or composition of only the nonmagnetic layers.

In the above-mentioned embodiments, the description has been given with regard to a composite thin film magnetic head. However, the thin film magnetic head of the invention can be used as a thin film magnetic head for reproducing only. Moreover, the recording head and the reproducing head may be stacked in reverse order.

As described above, according to a thin film magnetic head of the invention, a stack has a projecting portion which projects so as to face a signal magnetic field. Therefore, the number of magnetic layers of the stack can be increased without increasing the length of the surface of the stack facing the magnetic medium. As a result, the rate of resistance change can be increased. That is, an effect of being able to obtain resistance properties adapting to ultra-high density is achieved.

According to a thin film magnetic head of an aspect of the invention, a length of the projecting portion along the projecting direction thereof is 0.1 µm or less. An effect of being able to reliably capture the signal magnetic field is therefore achieved.

According to a thin film magnetic head of another aspect of the invention, a current path for passing a current through the stack in the direction of stacking is provided. An effect of being able to increase the rate of resistance change and the resistance is therefore achieved, as compared to the case in which a current is passed parallel to the direction perpendicular to the direction of stack.

According to a thin film magnetic head of still another aspect of the invention, a pair of shield layers and a pair of gap layers sandwiching the stack therebetween function as the current path. Thus, it is not necessary to form an additional lead layer. An effect of reducing manufacturing costs is therefore achieved.

According to a thin film magnetic head of a further aspect of the invention, there is provided a magnetic field capture limiting portion for partially limiting an effect of the signal magnetic field of the magnetic medium on the stack through the edge face. An effect of being able to more reliably prevent erroneous detection of adjacent signal magnetic fields is therefore achieved.

According to a thin film magnetic head of a further aspect of the invention, a magnetic field capture limiting portion is provided at the position corresponding to a part of the stack on the side of the stack close to the magnetic medium. Thus, the capture of the signal magnetic field by the stack can be partially limited by a part of the stack. An effect of being able to more reliably prevent erroneous detection of adjacent signal magnetic fields is therefore achieved.

According to a thin film magnetic head of a further aspect of the invention, the stack is partially in contact with at least one of a pair of shield layers. Thus, the signal magnetic field can be more effectively captured into the stack. As a result, an effect of being able to further increase the rate of resistance change is achieved.

According to a thin film magnetic head of a further aspect of the invention, there is provided a pair of magnetic domain control layers for sandwiching the stack therebetween in the direction perpendicular to the direction of stacking and for controlling the orientations of magnetizations of the magnetic layers. An effect of being able to easily control the magnetic domain of the stack is therefore achieved.

According to a thin film magnetic head of a further aspect of the invention, at least one of a plurality of magnetic layers is made of a material containing at least Co in a group including Co, Fe and Ni, or a material containing at least Ni in a group including Ni, Co, Fe, Cr, Ta, Rh, Mo, Zr and Nb. An effect of being able to increase the rate of resistance change or the resistance is therefore achieved.

According to a thin film magnetic head of a further aspect of the invention, at least one of a plurality of magnetic layers includes a cobalt-containing layer containing at least Co in a group including Co, Fe and Ni, and a nickel-containing layer containing at least Ni in a group including Ni, Co, Fe, Cr, Ta, Rh, Mo, Zr and Nb. An effect of being able to increase both the resistance and the rate of resistance change is therefore achieved.

According to a thin film magnetic head of a further aspect of the invention, a thickness of each of the magnetic layers is from 1 nm to 6 nm inclusive. Therefore, achieved is an effect that antiferromagnetic coupling energy induced between the magnetic layers can have a proper value.

According to a thin film magnetic head of a further aspect of the invention, the number of the magnetic layers is from 2 to 20 inclusive. An effect of being able to increase the rate of resistance change without reducing the sensitivity to the signal magnetic field is therefore achieved.

According to a thin film magnetic head of a further aspect of the invention, at least one of a plurality of nonmagnetic layers contains at least one element in a group consisting of Au, Ag, Cu, Ru, Rh, Re, Pt and W. An effect of being able to increase the rate of resistance change is therefore achieved.

According to a thin film magnetic head of a further aspect of the invention, at least one of a plurality of nonmagnetic layers is made of a material containing Ni and Cr. An effect of being able to improve the thermal stability is therefore achieved.

According to a thin film magnetic head of a further aspect of the invention, one of the nonmagnetic layers, which is located on one outermost side in the direction of stacking, is made of a material containing Ni and Cr. An effect of being able to further improve the thermal stability is therefore achieved.

According to a thin film magnetic head of a further aspect of the invention, a thickness of each of the nonmagnetic layers is set so as to maximize antiferromagnetic coupling induced between two magnetic layers adjacent to each other with each of the nonmagnetic layers in between. An effect of being able to further increase the rate of resistance change is therefore achieved.

According to a thin film magnetic head of a further aspect of the invention, the antiferromagnetic coupling energy induced between two magnetic layers adjacent to each other with each of the nonmagnetic layers in between is from $0.1 \times 10^{-4}$ $J/m^2$ to $2.0 \times 10^{-4}$ $J/m^2$ inclusive. An effect of being able to increase the rate of resistance change without reducing the sensitivity is therefore achieved.

According to a thin film magnetic head of a further aspect of the invention, the stack has a plurality of regions into which the stack is divided in the direction of stacking, and at least two regions of the regions differ from each other in a material or composition of the magnetic layers. Both the rate of resistance change and the resistance can be therefore increased.

According to a thin film magnetic head of a further aspect of the invention, the stack has a first region including the magnetic layers made of a material containing at least Ni in a group including Ni, Co, Fe, Cr, Ta, Rh, Mo, Zr and Nb, and a second region including the magnetic layers made of a material containing at least Co in a group including Co, Fe and Ni. An effect of being able to increase both the resistance and the rate of resistance change is therefore achieved.

According to another thin film magnetic head of the invention, there is provided a shield layer having a magnetic field capture limiting portion for partially limiting an effect of the signal magnetic field of the magnetic medium on the stack through the edge face. An effect of being able to more reliably prevent erroneous detection of adjacent signal magnetic fields is therefore achieved.

According to still another thin film magnetic head of the invention, there is provided a shield layer having a magnetic field capture limiting portion formed in an area corresponding to the part of the stack. Thus, the capture of the signal magnetic field by the stack can be limited by a part of the stack. An effect of being able to more reliably prevent erroneous detection of adjacent signal magnetic fields is therefore achieved.

According to a further thin film magnetic head of the invention, the stack is partially in contact with at least one of a pair of shield layers. Thus, the signal magnetic field can be more effectively captured into the stack. As a result, an effect of being able to further increase the rate of resistance change is achieved.

According to a magnetic transducer of the invention, a stack has a projecting portion which projects so as to face a signal magnetic field. Therefore, the number of magnetic layers of the stack can be increased without increasing the length of the surface of the stack facing the magnetic medium. As a result, an effect of being able to increase the rate of resistance change is achieved.

According to another magnetic transducer of the invention, a magnetic field capture limiting portion is provided on the side of the stack close to the magnetic medium. An effect of being able to prevent erroneous detection of adjacent signal magnetic fields is therefore achieved.

According to still another magnetic transducer of the invention, a magnetic field capture limiting portion is provided in an area corresponding to a part of the stack on the side of the stack close to the magnetic medium. Thus, the capture of the signal magnetic field by the stack can be partially limited by a part of the stack. An effect of being able to more reliably prevent erroneous detection of adjacent signal magnetic fields is therefore achieved.

Obviously many modifications and variations of the present invention are possible in the light of the above teachings. It is therefore to be understood that within the scope of the appended claims the invention may be practiced otherwise than as specifically described.

What is claimed is:

1. A thin film magnetic head comprising:
a stack including a plurality of magnetic layers stacked alternately with a plurality of nonmagnetic layers, and
a pair of shield layers for sandwiching the stack therebetween with a pair of gap layers in between, wherein the stack has a projecting portion projecting toward a magnetic medium and an extending portion partly in contact with at least one of the pair of shield layers.

2. A thin film magnetic head according to claim 1, wherein a length of the projecting portion along the projecting direction thereof is 0.1 µm or less.

3. A thin film magnetic head according to claim 1, wherein the gap layers and the shield layers function as a current path for passing a current through the stack in a direction of the stacking.

4. A thin film magnetic head according to claim 3, wherein the stack has an edge face facing the magnetic medium,
and at least one of the pair of shield layers has a magnetic field capture liming portion for partially limiting an effect of a signal magnetic field of the magnetic medium on the stack through the edge face.

5. A thin film magnetic head according to claim 3, wherein the stack has a part facing a magnetic medium; and
at least one of the pair of shield layers has a magnetic field capture limiting portion provided in an area corresponding to the part of the stack.

6. A thin film magnetic head according to claim 1, wherein the stack has a pair of wide portions widened in a direction perpendicular to a direction of stacking and a pair of magnetic domain control layers is provided between the pair of wide portions and at least one of the pair of shield layers so as to sandwich the stack therebetween in a direction perpendicular to a direction of stacking, the pair of magnetic domain control layers controlling the orientations of magnetizations of the magnetic layers.

7. A thin film magnetic head according to claim 1, wherein at least one of the plurality of magnetic layers is made of a material containing at least cobalt in a group including cobalt (Co), iron (Fe) and nickel (Ni), or a material containing at least nickel in a group including nickel, cobalt, iron, chromium (Cr), tantalum (Ta), rhodium (Rh), molybdenum (Mo), zirconium (Zr) and niobium (Nb).

8. A thin film magnetic head according to claim 1, wherein at least one of the plurality of magnetic layers has a stacked structure including a nickel-containing layer made of a material containing at least nickel in a group including nickel, cobalt, iron, chromium, tantalum, rhodium, molybdenum, zirconium and niobium, and a cobalt-containing layer made of a material containing at least cobalt in a group including cobalt, iron and nickel.

9. A think film magnetic head according to claim 1, wherein a thickness of each of the plurality of magnetic layers is from 1 nm to 6 nm inclusive.

10. A thin film magnetic head according to claim 1, wherein the number of the plurality of magnetic layers is from 2 to 20 inclusive.

11. A thin film magnetic head according to claim 1, wherein at least one of the plurality of nonmagnetic layers is made of a material containing at least one element in a group including gold (Au), silver (Ag), copper (Cu), ruthenium (Ru), rhodium, rhenium (Re), platinum (Pt) and tungsten (W).

12. A thin film magnetic head according to claim 1, wherein at least one of the plurality of nonmagnetic layers is made of a material containing nickel and chromium.

13. A thin film magnetic head according to claim 1, wherein one of the plurality of nonmagnetic layers, which is located on one outermost side in a direction of stacking, is made of a material containing nickel and chromium.

14. A thin film magnetic head according to claim 1, wherein a thickness of each of the plurality of nonmagnetic layers is set so as to maximize antiferromagnetic coupling energy induced between two magnetic layers adjacent to each of the nonmagnetic layers.

15. A thin film magnetic head according to claim 1, wherein the antiferromagnetic coupling energy induced between two magnetic layers adjacent to each of the plurality of nonmagnetic layers is from $0.1 \times 10^{-4}$ $J/m^2$ to $2.0 \times 10^{-4}$ $J/m^2$ inclusive.

16. A thin film magnetic head according to claim 1, wherein the stack is divided into a plurality of regions in a direction of stacking, and at least two regions of the plurality of regions differ from each other in a material or composition of the magnetic layers.

17. A thin film magnetic head according to claim 16, wherein the stack has a first region where the magnetic layers are made of a material containing at least nickel in a group including nickel, cobalt, iron, chromium, tantalum, rhodium, molybdenum, zirconium and niobium, and a second region where the magnetic layers are made of a material containing at least cobalt in a group including nickel, cobalt and iron.

18. A thin film magnetic head according to claim 17, wherein the projecting portion is provided in the first region.

19. A thin film magnetic head comprising:
a stack including a plurality of magnetic layers stacked alternately with a plurality of nonmagnetic layers, and
a pair of magnetic domain control layers controlling orientations of magnetizations of the magnetic layers, wherein
the stack includes a first region and a second region which are divided in a direction of stacking,
the first region has a projecting portion projecting toward a magnetic medium and a pair of wide portions widened in a direction perpendicular to a direction of stacking, and
the pair of magnetic domain control layers is provided so as to sandwich the second region therebetween in the direction perpendicular to the direction of stacking.

* * * * *